United States Patent
Fujii et al.

(10) Patent No.: US 8,572,336 B2
(45) Date of Patent: Oct. 29, 2013

(54) STORAGE CONTROL APPARATUS AND STORAGE CONTROL APPARATUS MEMORY CONTROL METHOD

(75) Inventors: Masanori Fujii, Odawara (JP); Sumihiro Miura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 416 days.

(21) Appl. No.: 12/992,042

(22) PCT Filed: Oct. 14, 2010

(86) PCT No.: PCT/JP2010/006111
§ 371 (c)(1),
(2), (4) Date: Nov. 10, 2010

(87) PCT Pub. No.: WO2012/049709
PCT Pub. Date: Apr. 19, 2012

(65) Prior Publication Data
US 2012/0096229 A1    Apr. 19, 2012

(51) Int. Cl.
*G06F 12/00* (2006.01)
*G06F 13/00* (2006.01)

(52) U.S. Cl.
USPC ........... 711/159; 711/100; 711/154; 711/161; 711/165; 711/170; 711/E12.069; 711/E12.07; 711/E12.084

(58) Field of Classification Search
USPC .............. 711/100, 154, 159, 161, 165, 170, 711/E12.069, E12.07, E12.084
See application file for complete search history.

(56) References Cited

U.S. PATENT DOCUMENTS

| | | |
|---|---|---|
| 5,437,022 A | 7/1995 | Beardsley et al. |
| 7,444,467 B2 | 10/2008 | Ninomiya et al. |
| 2005/0193242 A1 | 9/2005 | Ash et al. |
| 2010/0211821 A1 | 8/2010 | Donie et al. |

FOREIGN PATENT DOCUMENTS

| | | |
|---|---|---|
| EP | 1 507 204 A2 | 2/2005 |
| JP | 2003-005916 | 1/2003 |
| JP | 2003-345530 | 12/2003 |

OTHER PUBLICATIONS

PCT International Search Report and Written Opinion on Application No. PCT/JP2010/006111 dated Oct. 20, 2011; 12 pages.

*Primary Examiner* — Midys Rojas
(74) *Attorney, Agent, or Firm* — Foley & Lardner LLP

(57) ABSTRACT

A storage control apparatus of the present invention is able to duplicatively manage data in a cache memory even during maintenance work. When a memory package CMPK3 specified by a user is removed from the apparatus 1 (S2), a microprocessor 2 changes a pair that has been configured using CMPK2 and CMPK3 to a pair of CMPK2 and a free area of a CMPK1. As a result, received data (S5) is respectively written to multiple cache memories (S6, S7), and duplicatively managed.

11 Claims, 22 Drawing Sheets

FIG. 6

CONFIGURATION INFORMATION — T10

| SLOT NUMBER (C10) | SERIAL NUMBER (C11) | ACCESSORY (C12) | STATUS (C13) |
|---|---|---|---|
| SLOT 1 | MPPK 0 | — | GOOD |
| SLOT 2 | MPPK 1 | — | GOOD |
| SLOT 3 | CMPK 0 | 4GB × 4 | GOOD |
| SLOT 4 | CMPK 1 | 4GB × 4 | GOOD |
| SLOT 5 | CMPK 2 | 2GB × 2 | GOOD |
| SLOT 6 | CMPK 3 | 2GB × 2 | GOOD |
| SLOT 7 | CMPK 4 | 4GB × 2 | GOOD |
| SLOT 8 | CMPK 5 | 4GB × 2 | GOOD |
| SLOT 9 | CMPK 6 | 4GB × 4 | GOOD |
| SLOT 10 | CMPK 7 | 4GB × 4 | FAILURE |
| ... | ... | ... | ... |

PAIR MANAGEMENT TABLE

| PAIR # (C20) | FIRST BOARD # (C21) | SECOND BOARD # (C22) |
|---|---|---|
| P0 | CMPK0 | CMPK1 |
| P1 | CMPK2 | CMPK3 |
| P2 | CMPK4 | CMPK5 |
| P3 | CMPK6 | M1 |

T30

MAINTENANCE PAIR MANAGEMENT TABLE

| MAINTENANCE # (C30) | FIRST BOARD # (C31) | SECOND BOARD # (C32) |
|---|---|---|
| M1 | CMPK7, DRAM_ADR71−72 | CMPK1, DRAM_ADR11−12 |
| | CMPK7, DRAM_ADR72−73 | CMPK3, DRAM_ADR31−32 |
| | CMPK7, DRAM_ADR73−74 | CMPK5, DRAM_ADR51−52 |
| | CMPK7, DRAM_ADR74−75 | CMPK1, DRAM_ADR12−13 |
| | CMPK7, DRAM_ADR75−76 | CMPK3, DRAM_ADR32−33 |
| | CMPK7, DRAM_ADR76−77 | CMPK5, DRAM_ADR52−53 |
| | CMPK7, DRAM_ADR77−78 | CMPK1, SSD_ADR11−12 |
| | ... | ... |

FIG. 9

| | | T40 |
|---|---|---|
| FREE AREA MANAGEMENT TABLE | | |
| C40 | C41 | C42 |
| BOARD # | START ADDRESS | END ADDRESS |
| CMPK0 | DRAM_ADR01 | DRAM_ADR09 |
| CMPK1 | DRAM_ADR11 | DRAM_ADR19 |
| CMPK2 | DRAM_ADR21 | DRAM_ADR29 |
| CMPK3 | DRAM_ADR31 | DRAM_ADR39 |
| CMPK4 | DRAM_ADR41 | DRAM_ADR49 |
| ... | ... | ... |
| CMPK0 | SSD_ADR01 | SSD_ADR09 |
| CMPK1 | SSD_ADR11 | SSD_ADR19 |
| CMPK2 | SSD_ADR21 | SSD_ADR29 |
| CMPK3 | SSD_ADR31 | SSD_ADR39 |
| CMPK4 | SSD_ADR41 | SSD_ADR49 |
| ... | ... | ... |

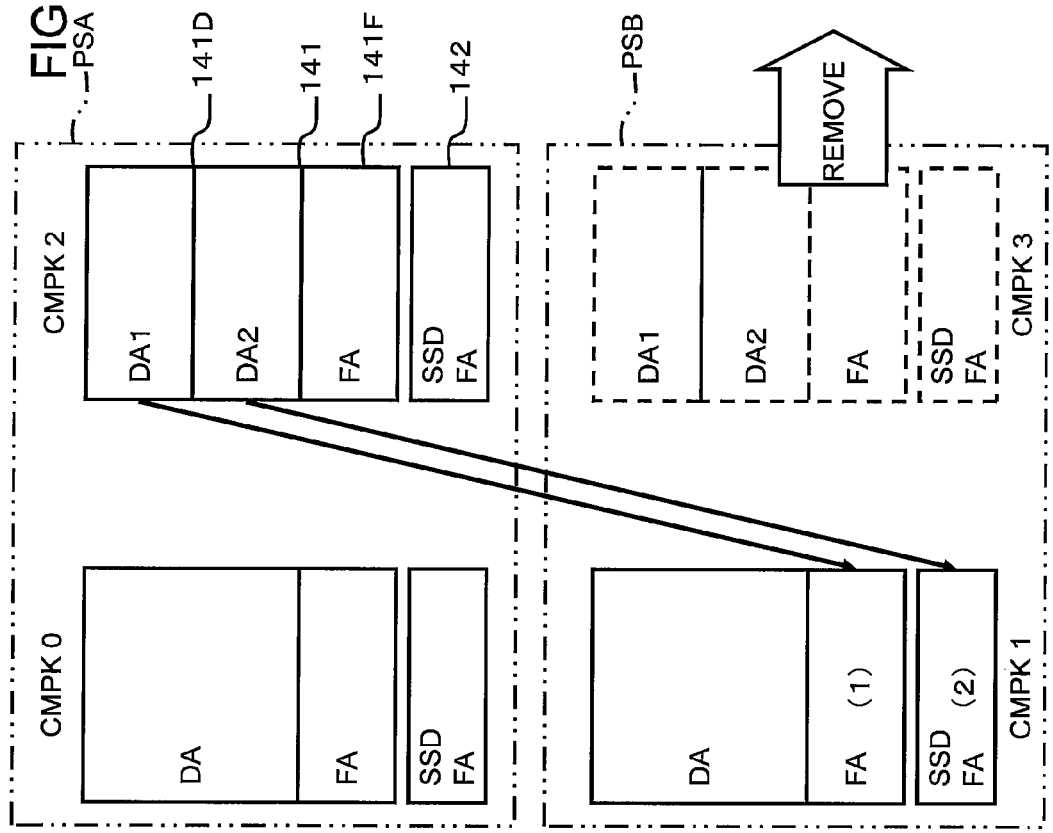

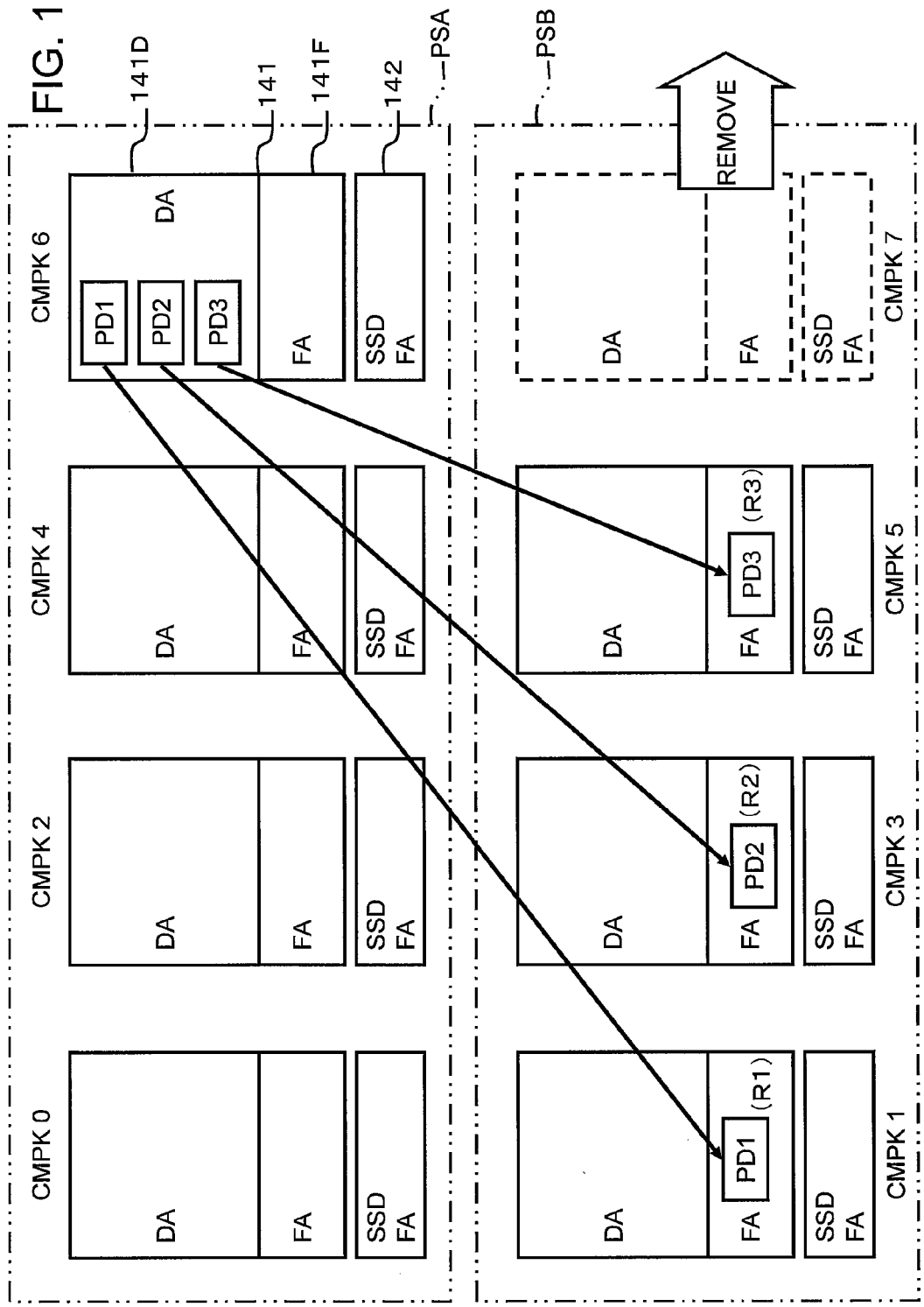

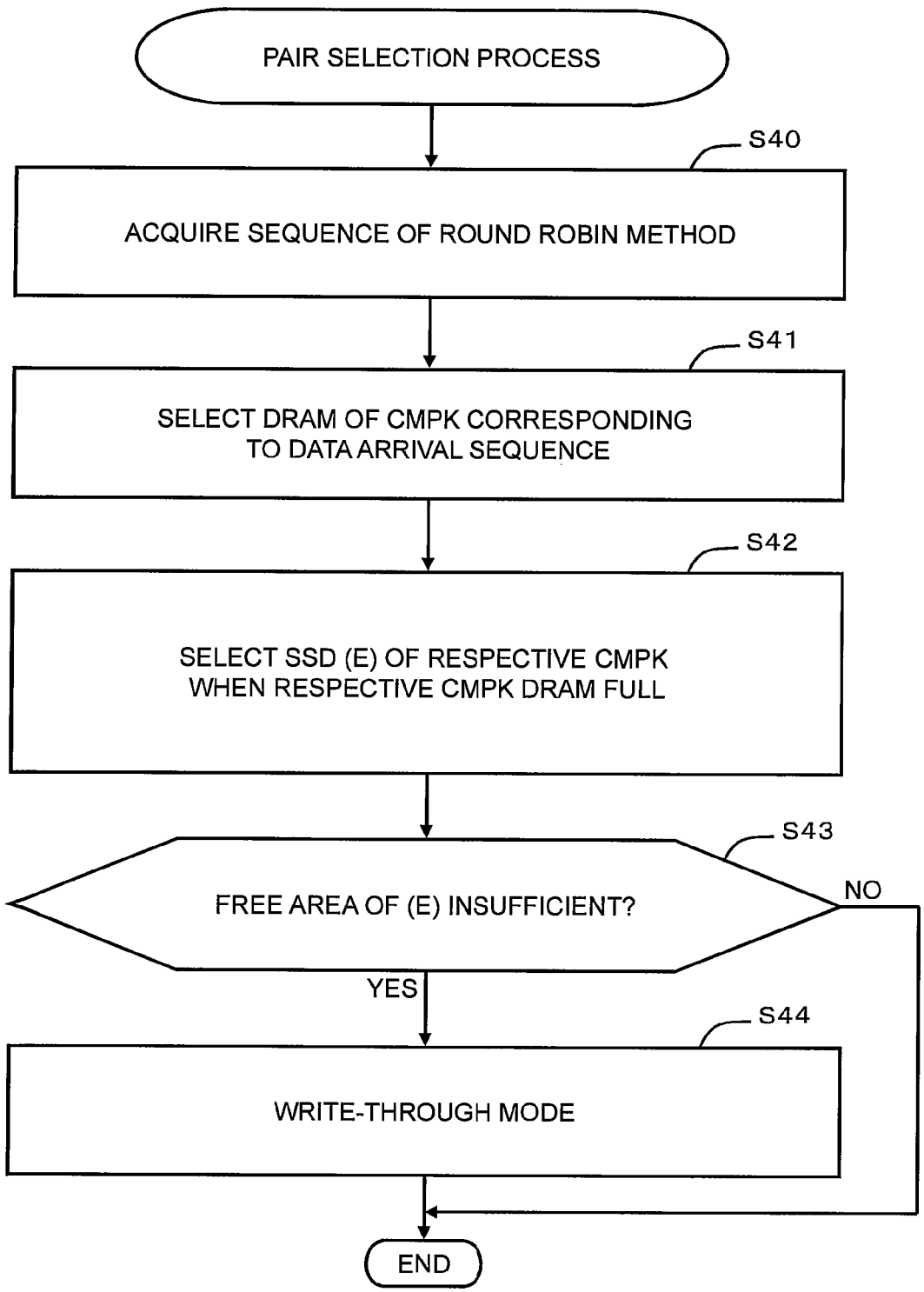

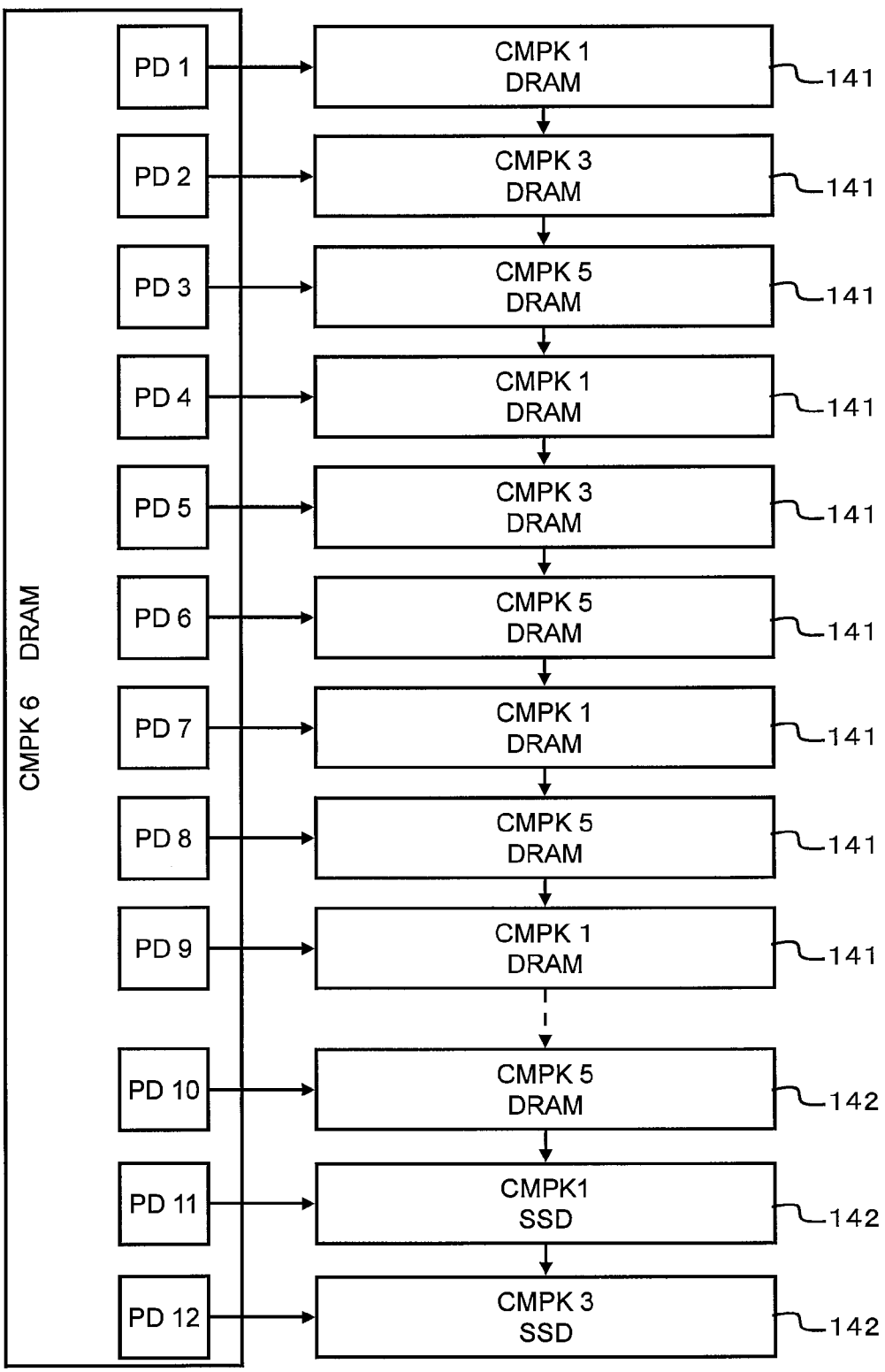

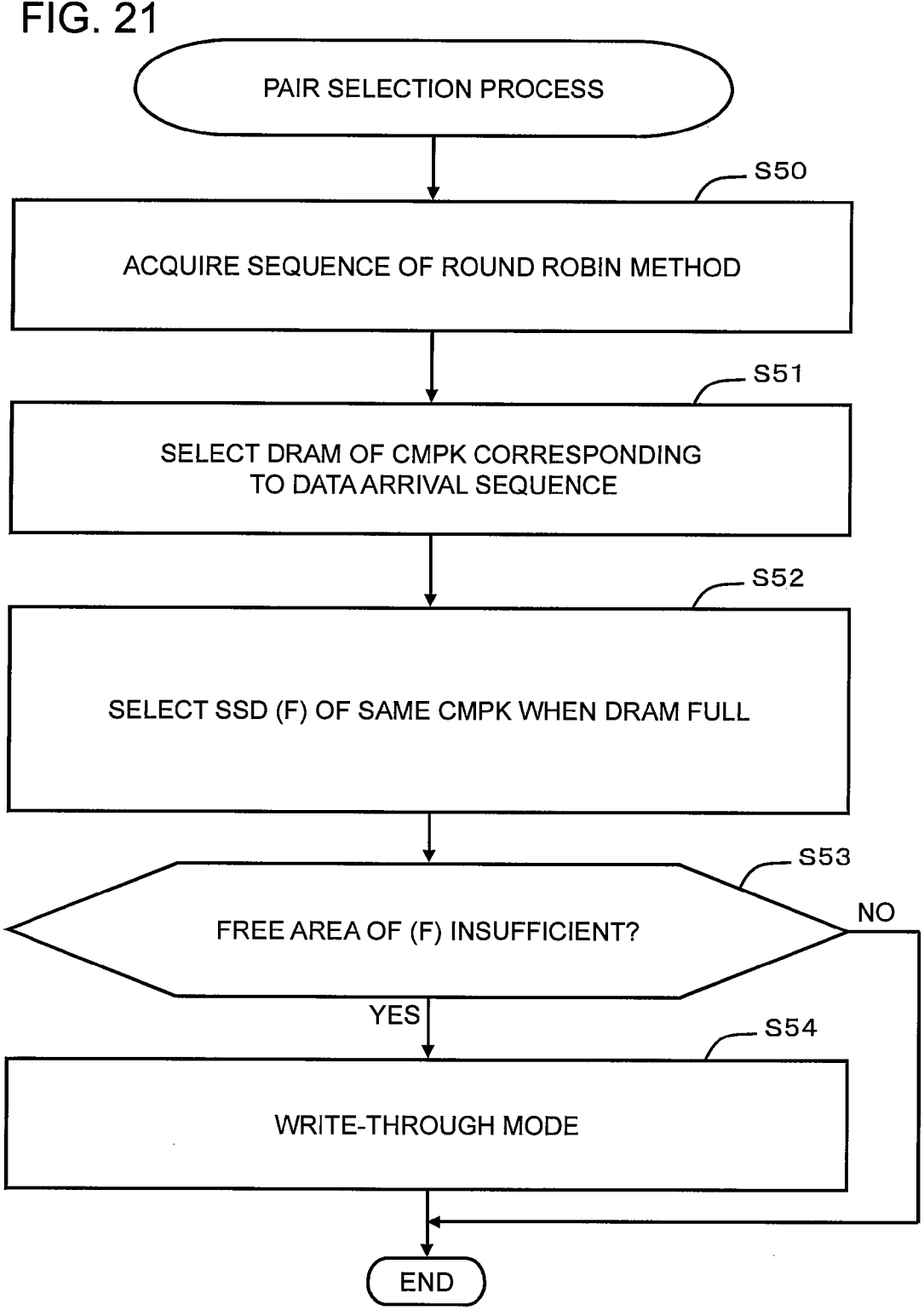

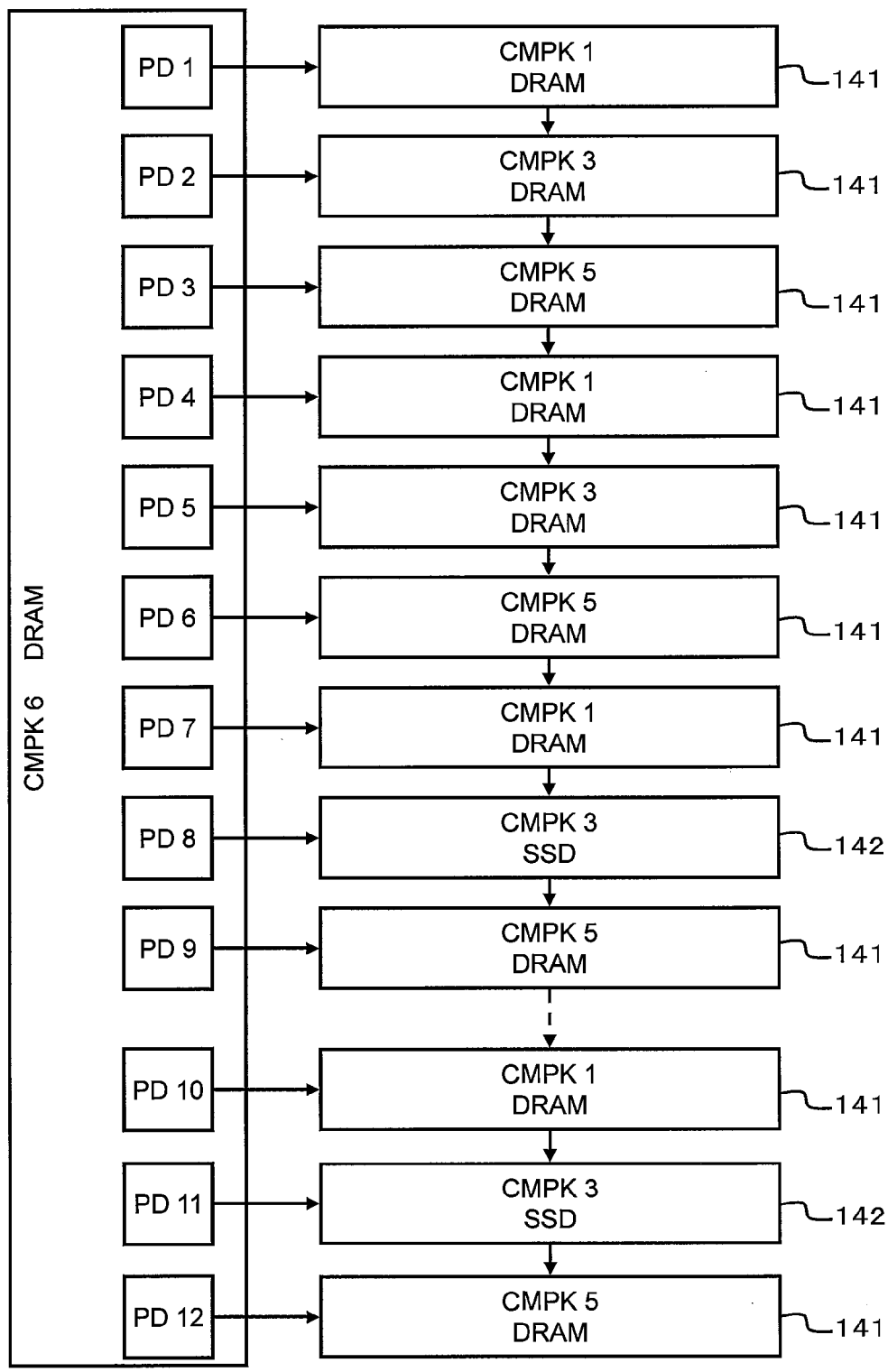

STORAGE CONTROL APPARATUS AND STORAGE CONTROL APPARATUS MEMORY CONTROL METHOD

TECHNICAL FIELD

The present invention relates to a storage control apparatus and a memory control method for a storage control apparatus.

BACKGROUND ART

Companies and other users use storage control apparatuses to manage data. The storage control apparatus stores data in redundant storage areas based on RAID (Redundant Array of Independent Disks) in sequence to protect the data.

There are storage control apparatuses that duplicate the data by respectively writing the data to multiple cache memory boards that receive power from different power devices (Patent Literature 1 and Patent Literature 2).

CITATION LIST

Patent Literature

[PTL 1]
Japanese Patent Application Publication No. 2003-345530
[PTL 2]
Japanese Patent Application Publication No. 2003-5916

SUMMARY OF INVENTION

Technical Problem

In the prior art described in the above-mentioned literature, because the same data is respectively written to multiple cache memory boards, data protection reliability is high. However, due either to the user's wishes or a malfunction, there are cases where one of the duplicated cache memory boards is removed from the storage control apparatus. For example, there are cases where a cache memory board is replaced when the size of the cache memory mounted to the cache memory board is to be either increased or decreased, or when a malfunction occurs.

In either event, the work-targeted cache memory board is removed from the storage control apparatus for a time. Therefore, the duplication configuration of the cache memory boards is lost until the work is completed.

While the duplication configuration of the cache memory boards is lost, it is necessary to either suspend receipt of commands issued from a host computer, or operate the storage control apparatus in the write-through mode. The write-through mode is a mode in which the host computer is notified of the completion of write command processing after the received data has been written to both the cache memory and a storage device.

Suspending the receipt of commands from the host computer while the duplication configuration of the cache memory boards is lost lowers user usability. In a case where operation is performed in the write-through mode while the duplication configuration of the cache memory boards is lost, the response performance of the storage control apparatus drops.

In this way, in the case of the prior art, customer satisfaction declines when maintenance work is performed on the cache memory board.

Consequently, an object of the present invention is to provide a storage control apparatus and a storage control apparatus memory control method that makes it possible to curb drops in user usability and response performance when replacing a memory part. Other objects of the present inventions should become clear from the description of the embodiment, which will be explained hereinbelow.

Solution to Problem

A storage control apparatus of the present invention for solving the above-mentioned problems is a storage control apparatus that inputs and outputs data in response to a request from a higher-level apparatus, and comprises multiple clusters that are powered by different power devices, wherein each of the clusters comprises a first communication control part for communicating with the higher-level apparatus, a second communication control part for communicating with a storage device that stores data, multiple memory parts, which are shared by the first communication control part and the second communication control part, and a control part for controlling the first communication control part, the second communication control part, and the memory parts. Each of the memory parts comprises a first memory having volatility, a second memory having nonvolatility, and a battery part for supplying power to the first memory and/or the second memory in a prescribed case. Each memory part and a memory part that belong to mutually different clusters configure a pair. Each control part, in a case where anyone of the memory parts is to be replaced, selects, as an alternate memory part to be used in place of the replacement-target memory part, at least a portion of a storage area of at least one memory part from among memory parts other than a prescribed memory part that configures a pair with the replacement-target memory part, and configures a new pair using the prescribed memory part and the alternate memory part, and in a case where data related to the prescribed memory part is received, writes the data to the prescribed memory part and to the alternate memory part, respectively, and manages write locations of the data, and in a case where the replacement-target memory part is mounted, writes the data that is written to the alternate memory part, to the replacement-target memory part and reconfigures the pair using the replacement-target memory part and the prescribed memory part, and the battery part maintains data stored in the first memory by supplying power to the first memory in a case where the replacement-target memory part has been removed as the prescribed case.

The respective control parts may select as the alternate memory part an unused area of a first memory of each of all other memory parts which are included in the cluster to which the replacement-target memory part belongs from among the clusters.

The respective control parts may select as the alternate memory part an unused area of a second memory of each of all the other memory parts which are included in the cluster to which the replacement-target memory part belongs from among the clusters.

The respective control parts may select as the alternate memory part an unused area of a first memory of each of all memory parts other than the prescribed memory part which are included in another cluster that forms a pair with the cluster to which the replacement-target memory part belongs from among the clusters.

The respective control parts may select as the alternate memory part an unused area of a second memory of each of all the memory parts other than the prescribed memory part which are included in the other cluster that forms a pair with the cluster to which the replacement-target memory part belongs from among the clusters.

The present invention may be understood as a method for controlling the memory of the storage control apparatus. In addition, at least one portion of the configuration of the present invention may be configured as a computer program. This computer program may be affixed to a recording medium and distributed, or may be delivered via a communication network.

In addition, other combinations besides the combinations of the above-mentioned aspects will also be comprised within the scope of the present invention.

BRIEF DESCRIPTION OF DRAWINGS

FIG. 6 shows the configuration of configuration information that is stored in the microprocessor package as a single piece of management information.

FIG. 8 shows the configuration of the microprocessor package-stored pair management table at maintenance time.

FIG. 9 shows the configuration of a microprocessor package-stored table for managing a free area.

FIG. 17 is an illustration showing how data is distributed to multiple memory packages in a storage control apparatus related to a fourth example.

FIG. 18 is an illustration showing how data is distributed to multiple memory packages in a storage control apparatus related to a fifth example.

FIG. 19 is a flowchart showing a process for selecting a pair in accordance with a round robin method.

FIG. 20 is an illustration showing how received data is distributed to multiple memory packages in the order of arrival.

FIG. 21 is a flowchart showing a process for selecting a pair in accordance with a round robin method in a storage control apparatus related to a sixth example.

FIG. 22 is an illustration showing how received data is distributed to multiple memory packages in the order of arrival.

DESCRIPTION OF EMBODIMENTS

Figure 1:
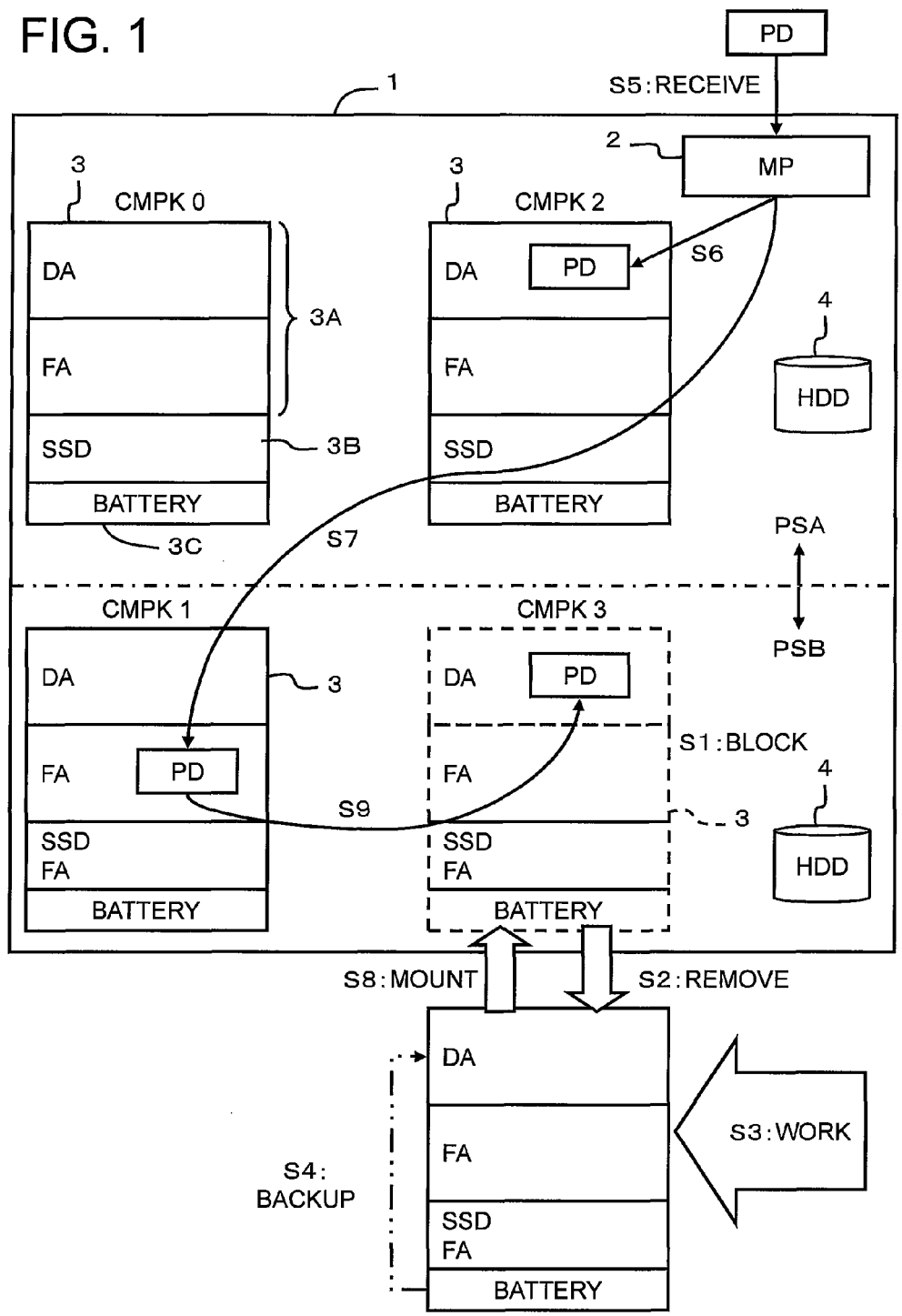
FIG. 1 is an illustration showing an overview of an embodiment of the present invention.

The embodiment of the present invention will be explained hereinbelow based on the drawings. First, an overview of the present invention will be explained by referring to FIG. 1, and next examples will be explained by referring to FIG. 2 and subsequent drawings. In FIG. 1, the present invention is described to the extent necessary for the present invention to be understood and put into practice. The scope of the present invention is not limited to the configuration described in FIG. 1. Characteristic features not described in FIG. 1 will be made clear in the examples explained hereinbelow.

As shown in the schematic diagram of FIG. 1, a storage control apparatus 1 comprises multiple (two in the example shown in the drawing) clusters, and each cluster is supplied with power from different power devices. In FIG. 1, a power source boundary PSA and a power source boundary PSB are shown as the ranges within which the power from the different power devices is supplied.

The respective clusters of the storage control apparatus 1 each comprise multiple microprocessors 2, memory packages 3, and storage devices 4. In FIG. 1, for convenience of explanation, only one microprocessor 2 is shown. The microprocessor 2 processes a command received from a host computer not shown in the drawing.

The memory package 3, for example, comprises a cache memory 3A as a "first memory", a SSD (Solid State Drive) 3B as a "second memory", and a battery 3C. The cache memory 3A, for example, comprises a memory such as a DRAM (Dynamic Random Access Memory).

The SSD 3B is an example of a memory that comprises nonvolatility, and the present invention is not limited to the SSD (flash memory device). For example, nonvolatile memory such as FeRAM (Ferroelectric Random Access Memory), MRAM (Magnetoresistive Random Access Memory), Ovonic Unified Memory, RRAM (Resistance RAM), and PRAM (Phase change RAM) may also be used.

Multiple memory packages 3 belonging to the one power source boundary PSA form one-to-one pairs with the other multiple memory packages 3 belonging to the other power source boundary PSB. In FIG. 1, "CMPK0", which belongs to the power source boundary PSA, and "CMPK1", which belongs to the power source boundary PSB, configure one pair. Similarly, "CMPK2", which belongs to the power source boundary PSA, and "CMPK3", which belongs to the power source boundary PSB, configure another one pair.

The microprocessor 2 writes data to the respective memory packages 3 that form a pair. For example, data that is targeted at "CMPK0" is written to both the "CMPK0" memory package 3 and the "CMPK1" memory package 3. In accordance with this, the same data is stored in different memory packages 3. Moreover, the memory packages 3 that configure each pair belong to the different power source boundaries PSA and PSB. Therefore, even in a case where a power outage or other such failure has occurred, it is possible to maintain the data of either one of the memory packages 3.

The cache memory 3A may be divided into two areas. The one is a data area (DA in the drawing) into which data is written. The other one is a free area (FA in the drawing) into which data is not written. More specifically, the same data as the data that is stored in the other memory package 3, which configures a pair with this memory package 3, is stored in the data area DA.

The battery 3C supplies power to the cache memory 3A and maintains the data stored in the cache memory 3A in a case where the memory package 3 has been removed from the storage control apparatus 1. In addition, the battery 3C prevents the loss of data by supplying power to the cache memory 3A when there is a power outage. In addition, the battery 3C supplies the power for copying data from the cache memory 3A to the SSD 3B.

In this embodiment, as will be explained further below, of the functions of the battery 3C, the function for protecting against data loss in the cache memory 3A that is mounted in the memory package 3 is used during the period that this memory package 3 is removed from the storage control apparatus 1.

The storage device 4, for example, comprises either a hard disk drive or a flash memory device. Write data received from the host computer is stored in the cache memory 3A of the memory package 3 and written from the cache memory 3A to the storage device 4 thereafter. A mode in which the host computer is notified to the effect that write command processing has been completed at the point in time at which the write data was written to the cache memory 3A is called write-after. Alternatively, a mode in which the host computer is notified to the effect that write command processing has been completed after writing the write data to the storage device 4 is called write-through.

Because the write-after mode enables higher response performance than the write-through mode, under normal circumstances, the write-after mode is used. As will be explained further below, the write-through mode is used in a special case, such as at maintenance time.

The operation of this embodiment will be explained. Normally, data that has been received from the host computer is written by the microprocessor 2 to the cache memory 3A of the memory package 3 corresponding to a write command-specified address. At the same time as this write, the same data is also written to the cache memory 3A of the other memory package 3 that configures a pair with this memory package 3. The microprocessor 2 notifies the host computer of write command processing completion at the point in time at which the same data was respectively written to the cache memories 3A of the respective memory packages 3 configuring the pair. Thereafter, a prescribed time is measured, and the data that was stored in the cache memory 3A is transferred and stored in the storage device 4.

The same data is stored in multiple storage devices 4 comprising the RAID 1. In the case of a RAID 5 or a RAID 6, the data is distributively written to multiple storage devices 4 comprising a parity group.

There may be cases where the cache memory 3A size is insufficient or a defect occurs in a portion of a cache memory 3A while using the storage control apparatus 1. In these cases, the user will specify any one memory package 3, and from a management terminal not shown in the drawing, will instruct that the storage control apparatus 1 perform a replacement.

The microprocessor 2, upon receiving the replacement instruction (replacement request) from the management terminal, executes a block process with respect to the specified memory package 3 (S1). The block process prepares the target memory package 3 for removal from the storage control apparatus 1.

When the block process is complete, the microprocessor 2 notifies the management terminal to the effect that the specified memory package 3 is able to be removed from the storage control apparatus 1.

The user, who confirms this notification, removes this memory package 3 from the storage control apparatus 1 (S2).

Replacement work (to include expansion work) can be carried out on the removed memory package 3 (S3). Cache memory 3A is either added to or removed from the removed memory package 3. Or, a malfunctioning cache memory 3A in the removed memory package 3 is removed and a new cache memory 3A is mounted in its place.

The battery 3C of the removed memory package 3 supplies power to the cache memory 3A and maintains the data stored in the cache memory 3A.

Meanwhile, a command (either a write command or a read command) may be issued from the host computer while the work (S3) is being performed. The microprocessor 2 receives the data PD corresponding to this command from either the host computer or the storage devices 4 (S5). In the case of a write command, the storage control apparatus 1 receives the write data from the host computer. In the case of a read command, the storage control apparatus 1 reads the data from the storage device 4. The data that is received from either the host computer or the storage device 4 is stored in the cache memory.

The microprocessor 2 identifies the memory package 3 corresponding to a logical address specified by the command. In the example of FIG. 1, the "CMPK2" memory package 3 is the write-target memory package. The microprocessor 3 confirms that the memory package 3 (CMPK3) configuring a pair with the write-target memory package 3 has been removed from the storage control apparatus 1 for maintenance.

The microprocessor 3 selects an alternate memory package 3 (CMPK1) for configuring a new pair with the write-target memory package 3 (CMPK2) in place of the removed memory package 3 (CMPK3).

In the example of FIG. 1, either one or both of the memory package 3 (CMPK0) and the memory package 3 (CMPK1) are capable of being selected as the alternate memory package. The memory package 3 (CMPK1), which belongs to a power source boundary PSB different from that to which the write-target memory package 3 (CMPK2) belongs, will be selected here as the alternate memory package.

This is because writing the same data to two memory packages 3 (CMPK2 and CMPK1) that belong to different power source boundaries enables higher data protection reliability than when the same data is written to two memory packages (CMPK2 and CMPK0) that belong to the same power source boundary.

After defining the new pair, the microprocessor 2 writes the received data PD to the write-target memory package 3 (CMPK2) (S6). In addition, the microprocessor 2 also writes the received data PD to the free area of the cache memory 3A of the alternate memory package 3 (CMPK1) configuring the new pair (S7).

In so doing, the storage control apparatus 1 processes the command while the maintenance work is being performed (S5, S6, S7). When the maintenance work is complete and the work-target memory package 3 (CMPK3) is remounted to the storage control apparatus 1 (S8), a data restore is started.

The microprocessor 2 cancels the temporary pair (the pair of CMPK2 and CMPK1) for maintenance work, and reconfigures the pre-maintenance work pair (the pair of CMPK2 and CMPK3). The microprocessor 2 copies the data PD (the data generated at maintenance work time) that was written to the free area FA of the alternate memory package 3 (CMPK1) to a prescribed location of the memory package 3 (CMPK3) that has been remounted to the storage control apparatus 1 (S9).

The microprocessor 2 invalidates the data PD written to the free area FA of the alternate memory package 3 (CMPK1) and makes overwrite possible.

Furthermore, this embodiment describes a case in which only the free area FA of the cache memory 3A is used as the alternate pair, but as will be shown in the examples explained further below, a free area of the nonvolatile memory 3B may also be used.

In addition, this embodiment describes a case in which the area that constitutes the alternate pair is configured using only the free area of one memory package 3, but as will be shown in the examples explained further below, the free areas FA of multiple memory packages may be used to configure the alternate pair area.

In accordance with configuring this embodiment like this, in a case where maintenance work is performed on a memory package 3, a new pair is configured by selecting an alternate memory package 3 to be used in place of the maintenance work-target memory package 3. Therefore, the storage control apparatus 1 need not be suspended even during maintenance work, thereby enhancing user usability. In addition, since data in the cache memory can be duplicated even during maintenance work, it is possible to maintain the reliability of the storage control apparatus 1. In addition, because data can be duplicated in the cache memory, there is no need to switch to the write-through mode, making it possible to prevent a drop in the response performance of the storage control apparatus 1.

Furthermore, as shown in the examples explained further below, in a case where an alternate pair cannot be configured, it is possible to switch to the write-after mode.

EXAMPLE 1

Figure 2:
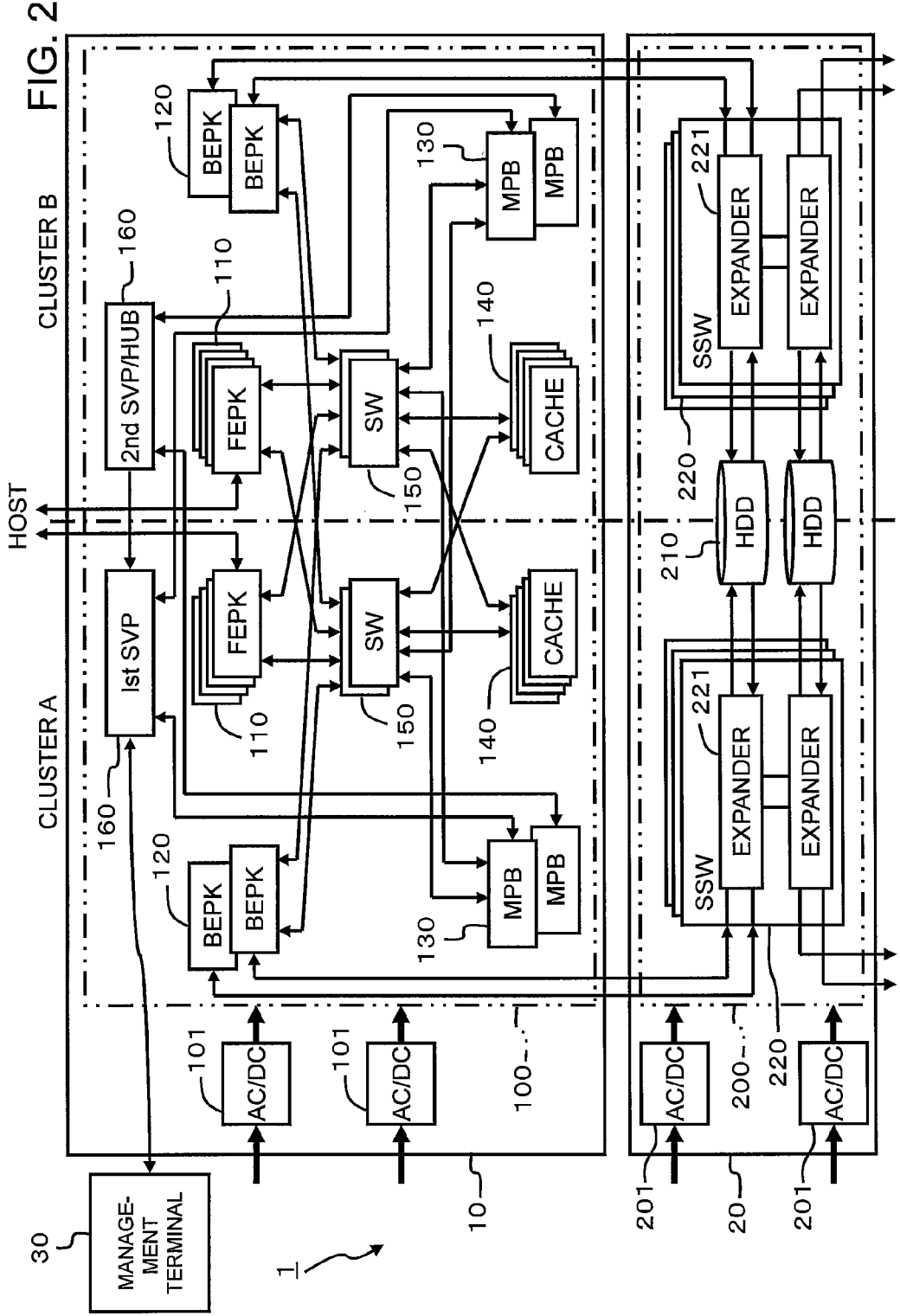
FIG. 2 is a diagram showing the entire configuration of a storage control apparatus.

FIG. 2 shows the entire configuration of a storage control apparatus 1 related to this example. The corresponding relationship with FIG. 1 will be explained first. The memory package 3 corresponds to a memory package 140, the cache memory 3A corresponds to a cache memory 141 (refer to FIG. 3), the nonvolatile memory 3B corresponds to a nonvolatile memory 142 (refer to FIG. 3), and the battery 3C corresponds to a battery 143 (refer to FIG. 3). The microprocessor 2 corresponds to a microprocessor 131 (refer to FIG. 3), and the storage device 4 corresponds to a storage device 210. Furthermore, in the following explanation, there may be cases where the cache memory is expressed as DRAM and the nonvolatile memory is expressed as SSD for convenience sake, but the intention is not to limit the cache memory to DRAM or to limit the nonvolatile memory to SSD.

The storage control apparatus 1, for example, comprises one controller chassis 10, and at least one drive chassis 20. The storage control apparatus 1 comprises a redundant configuration in accordance with a first cluster shown in the left side of FIG. 2 and a second cluster shown in the right side of FIG. 2. The clusters comprise the same configuration, and, in addition, the clusters are able to operate in conjunction with one another. Therefore, even in a case where either one of the clusters is suspended due to a malfunction, the other cluster can be used to operate the storage control apparatus 1.

The controller chassis 10 comprises a controller 100 for controlling the operation of the storage control apparatus 1. The first cluster and the second cluster are set in the controller 100, and power is respectively supplied to these clusters from multiple AC/DC power sources 101.

The power sources of the clusters are each independent. In the following explanation, the bounds within which the different power sources are supplied will be called the power source boundaries. The AC/DC power sources 101 have also been made redundant, and even in a case where either one of the AC/DC power sources 101 is suspended due to a malfunction or the like, the other AC/DC power source 101 will be able to supply power.

The configuration of the controller 100 will be explained by focusing on the first cluster from among the first cluster and the second cluster set in the controller 100. For example, multiple channel adapters 110, multiple disk adapters 120, multiple control packages 130, multiple memory packages 140, multiple switches 150, and at least one management terminal 160 are provided in the portion of the controller 100 that belongs to the first cluster. The portion comprising the second cluster also has the same configuration.

The channel adapter 110 is equivalent to a "first communication control part". The channel adapter 110 (hereinafter, CHA 110) controls the communications with the host. The CHA 110 receives either various types of commands or write data issued from the host. Write data that has been received is stored in the cache memory 141 (refer to FIG. 3) in the memory package 140. In addition, the CHA 110 sends data read from the storage device 210 to the host.

The not-shown host, for example, is configured either as a mainframe computer or an open system server computer. In a case where the host is a mainframe computer, the CHA 110, for example, communicates with the host in accordance with a communication protocol, such as FICON (Fibre Connection: registered trademark), ESCON (Enterprise System Connection: registered trademark), ACONARC (Advanced Connection Architecture: registered trademark), or FIBARC (Fibre Connection Architecture: registered trademark).

In a case where the host is a server computer, for example, data communications are carried out in accordance with a communication protocol, such as FCP (Fibre Channel Protocol), iSCSI (internet Small Computer System Interface), or TCP/IP (Transmission Control Protocol/Internet Protocol). Furthermore, the host is not limited to a server computer or a mainframe computer, and, for example, various types of apparatuses capable of issuing a command may be used, such as a mobile telephone, a handheld terminal, or a television set.

The disk adapter 120 corresponds to a "second communication control part". The disk adapter 120 (hereinafter, DKA 120) controls communications with the respective storage devices 210 inside the drive chassis 20. Any communication protocol may be used, and the DKA 120, for example, communicates with the storage device 210 using FCP or another such communication protocol. The DKA 120 reads data from either one or multiple storage devices 210, and stores same in the cache memory 141 in the memory package 140.

The microprocessor package 130 corresponds to a "control part". The microprocessor package 130 communicates with the respective CHA 110 and the respective DKA 120, and controls the operations thereof. The microprocessor package 130, for example, comprises multiple microprocessors and a local memory.

The microprocessor package 130 is coupled to the respective management terminals 160, and changes the configuration inside the storage control apparatus 1 in accordance with an instruction from the management terminal 160. In addition, the microprocessor package 130 collects information related to the status inside the storage control apparatus 1, and sends same to the management terminal 160.

The memory package 140 corresponds to a "memory part". The configuration of the memory package 140 will be explained using FIG. 3.

The switch 150 couples the respective CHA 110, the respective DKA 120, the respective microprocessor packages 130, and the respective memory packages 140 to one another. The circuits 110 through 140 belonging to the one cluster are coupled to the same type circuits 110 through 140 belonging to the other cluster by way of the switch 150.

The service processor 160 (hereinafter, the SVP 160) is coupled via a communication network like a LAN (Local Area Network) to a management terminal 30, which can comprise either a personal computer or a handheld terminal.

The SVP 160 collects information related to the various states of the storage control apparatus 1, and sends the information to the management terminal 30 either as-is or processed. In addition, the user (including the maintenance personnel) is able to input various commands to the storage control apparatus 1 from the management terminal 30 by way of the SVP 160. Based on this instruction, the controller 100, for example, blocks the memory package 140, either creates or deletes a logical volume, associates the logical volume with a communication port, and carries out an access control setting.

Furthermore, although omitted from the drawing in FIG. 2, the lines (communication paths) connecting the respective circuits 110 through 140 may also be made redundant.

The configuration of the drive chassis 20 will be explained. The drive chassis 20 houses multiple storage devices 210. The drive chassis 20 comprises a disk unit 200 (hereinafter, DKU 200), and an AC/DC power source 201 for supplying power to the DKU 200.

The DKU 200 comprises multiple storage devices 210, and a switching circuit 220 (hereinafter, the SSW 220). A first cluster and a second cluster are also provided in the DKU 200, and the DKU 200 comprises a redundant configuration. Power is respectively supplied to each of the clusters from multiple AC/DC power sources 201.

The SSW 220 comprises a communication circuit (hereinafter, the expander) 221 for communicating with the storage device 210. An upstream expander 221 is coupled to the DKA 120 in the controller 100. A downstream expander 221 is coupled to the upstream expander in the adjacently coupled next DKU 200. Due to space constraints, only one DKU 200 is shown, but multiple DKU 200 are coupled daisy-chain fashion in the controller 100.

As the storage devices 210, for example, a hard disk device, a semiconductor memory device, an optical disk device, a magneto-optical disk device or other such types of storage devices that are capable of reading and writing data may be used.

In a case where a hard disk device is used as the storage device, for example, a FC (Fibre Channel) disk, a SCSI (Small Computer System Interface) disk, a SATA disk, an ATA (AT Attachment) disk, a SAS (Serial Attached SCSI) disk or the like may be used. In a case where a semiconductor memory device is used as the storage device, for example, a flash memory, a FeRAM, a MRAM, an Ovonic Unified Memory, a RRAM, a PRAM or other such memory device may be used.

Figure 3:
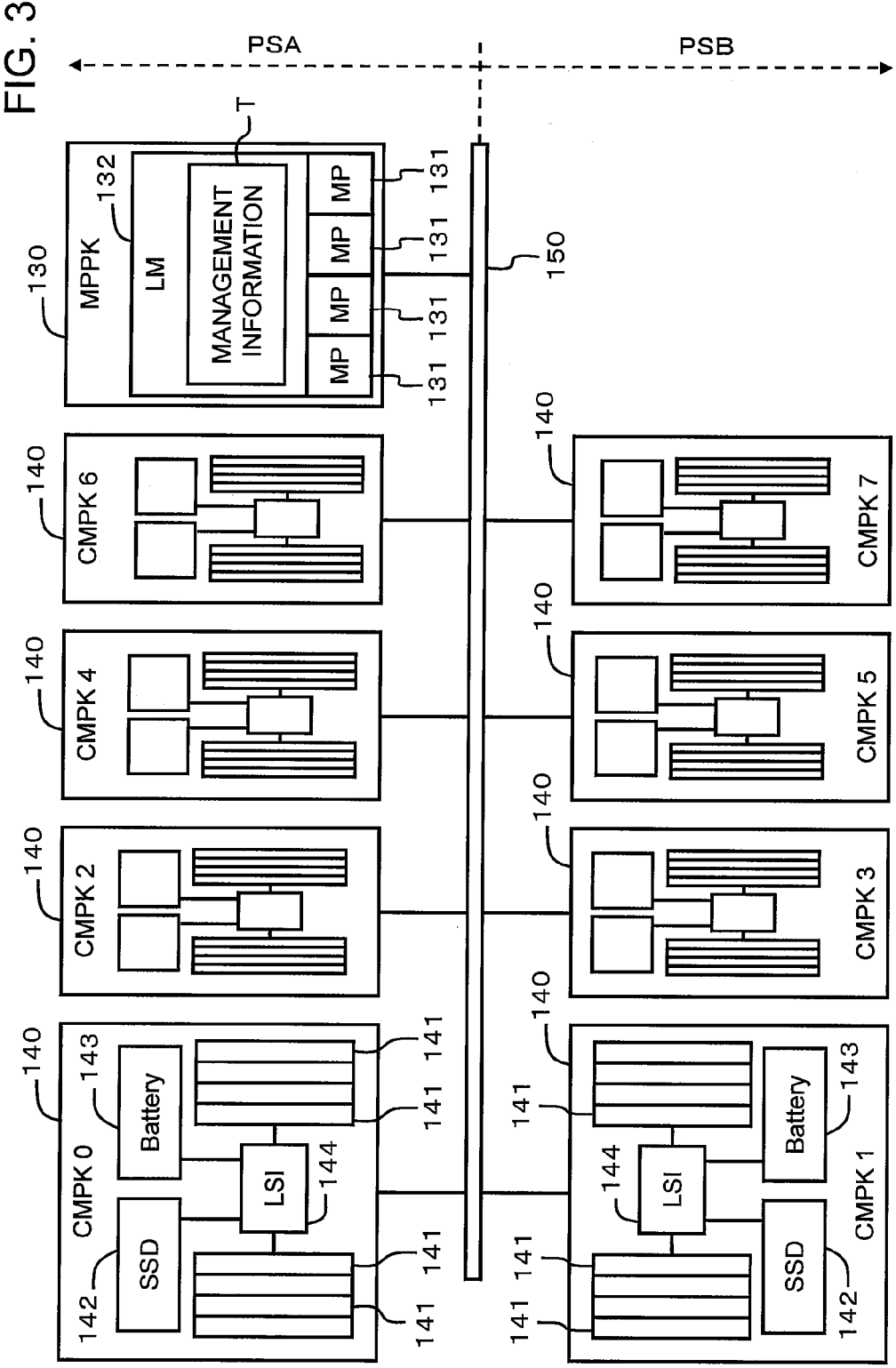
FIG. 3 is a diagram showing a memory package pair configuration and microprocessor package configuration.

FIG. 3 shows the configurations of respective memory packages 140 and one microprocessor package 130. For convenience sake, only one microprocessor package 130 is shown. The microprocessor package 130, for example, comprises multiple microprocessors 141 and a local memory 132 that is shared by the respective microprocessors 141. Various management information T for controlling the operation of the storage control apparatus 1 is stored in the local memory 132. Of the management information T, the management information related to the control of the cache memory will be explained further below.

Each memory package 140 configures a pair with a partner memory package 140 that belongs to a mutually different power source boundary. The pair is for duplicatively managing cache data.

In the example of FIG. 3, a memory package 140 (CMPK0) belonging to the one power source boundary PSA configures a pair with a memory package 140 (CMPK1) belonging to the other power source boundary PSB. Similarly, a memory package 140 (CMPK2) belonging to the power source boundary PSA configures a pair with a memory package 140 (CMPK3) belonging to the power source boundary PSB. A memory package 140 (CMPK4) belonging to the power source boundary PSA configures a pair with a memory package 140 (CMPK5) belonging to the power source boundary PSB. A memory package 140 (CMPK6) belonging to the power source boundary PSA configures a pair with a memory package 140 (CMPK7) belonging to the power source boundary PSB.

The cache memory size of the memory packages 140 configuring the respective pairs may be the same. The cache memory size of each pair may also differ. For example, a pair having a cache memory size of 10 GB and a pair having a cache memory size of 20 GB may coexist inside the storage control apparatus 1.

Figure 4:
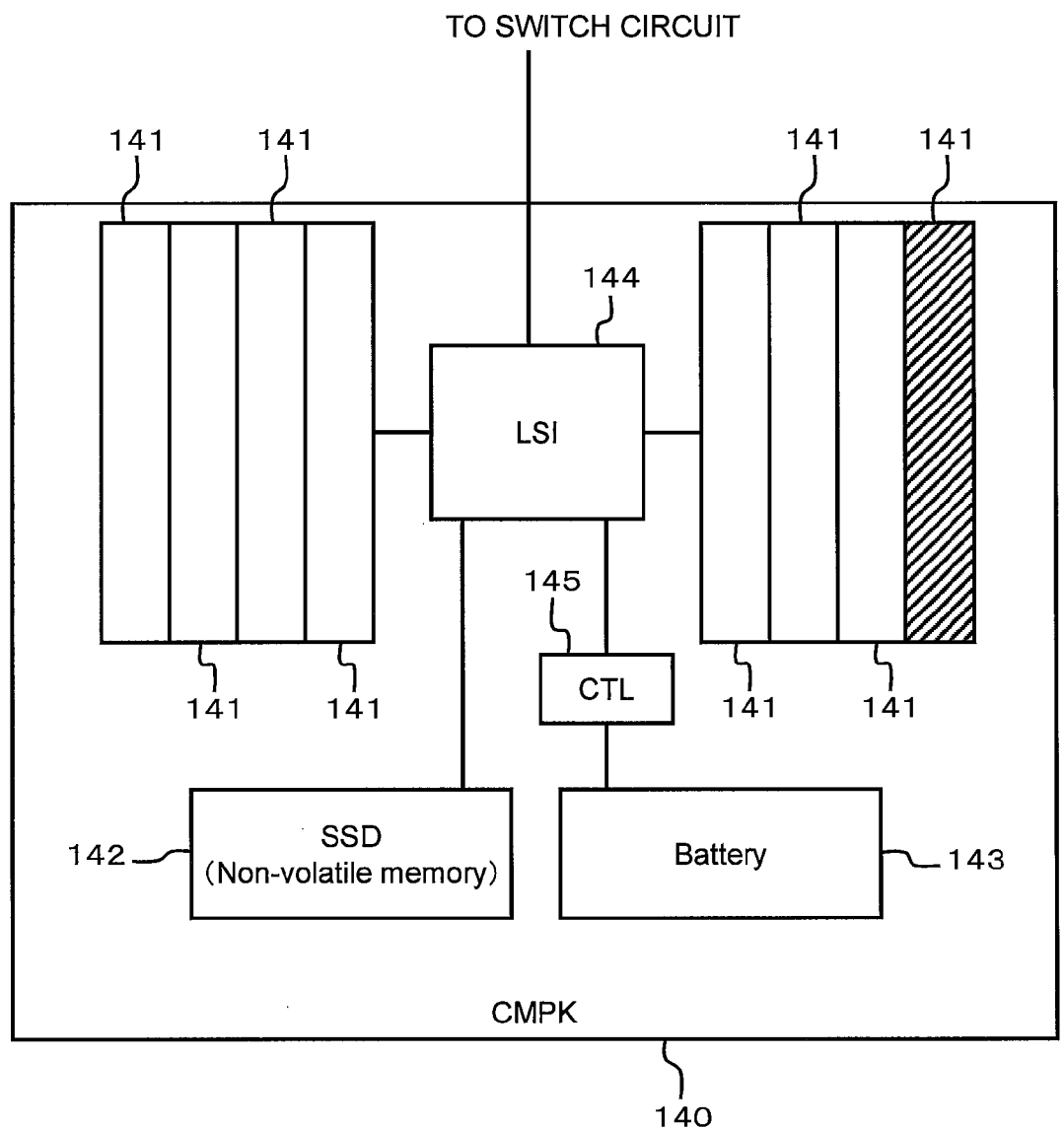
FIG. 4 shows the configuration of one memory package.

FIG. 4 shows an enlarged view of one memory package 140. The memory package 140, for example, may comprise multiple cache memories 141, at least one nonvolatile memory 142, at least one battery 143, at least one memory controller 144, and at least one battery controller 145.

The cache memory 141 that serves as the "first memory" is configured as a memory module mounted with a DRAM or other such volatile memory. The cache memory 141, for example, is mounted to the memory package 140 substrate in sets of two. The number of cache memories 141 can be increased or decreased while the storage control apparatus 1 is in operation.

A nonvolatile memory 144 that serves as the "second memory", for example, is configured from a memory such as a flash memory device. Data (user data and/or management data) stored in the cache memory 141 is transferred and stored in the nonvolatile memory 144 when a power outage occurs. When the power outage is resolved, the data saved to the nonvolatile memory 144 is returned to the cache memory 141. The nonvolatile memory 144 can be either replaced, or increased or decreased without removing the cache memory 141.

The memory controller (LSI: Large Scale Integration in the drawing) 144 controls the data input/output related to the cache memory 141, and data input/output related to the nonvolatile memory 144.

The battery pack 143 (hereinafter the battery 143) that serves as the "battery", for example, comprises multiple lithium ion batteries or other such cells. The battery 143 is constantly being charged from the AC/DC power source 101. When a power outage occurs, the battery 143 operates to supply power to the cache memory 141 and so forth. The battery controller 145 controls the charging and discharging of the battery 143.

In addition, in this example, when the memory package 140 is removed from the storage control apparatus 1 and the coupling between the AC/DC power source 101 and the memory package 140 is disconnected, the battery 143 supplies power to the cache memory 141. In accordance with this, the data being stored in the cache memory 141 is maintained while the memory package 140 is removed from the storage control apparatus 1 for maintenance work. Therefore, it is possible to shorten the time required for data restore processing when the maintenance work has ended. This is because only the difference with the data of prior to the start of maintenance work needs to be copied.

Figure 5:
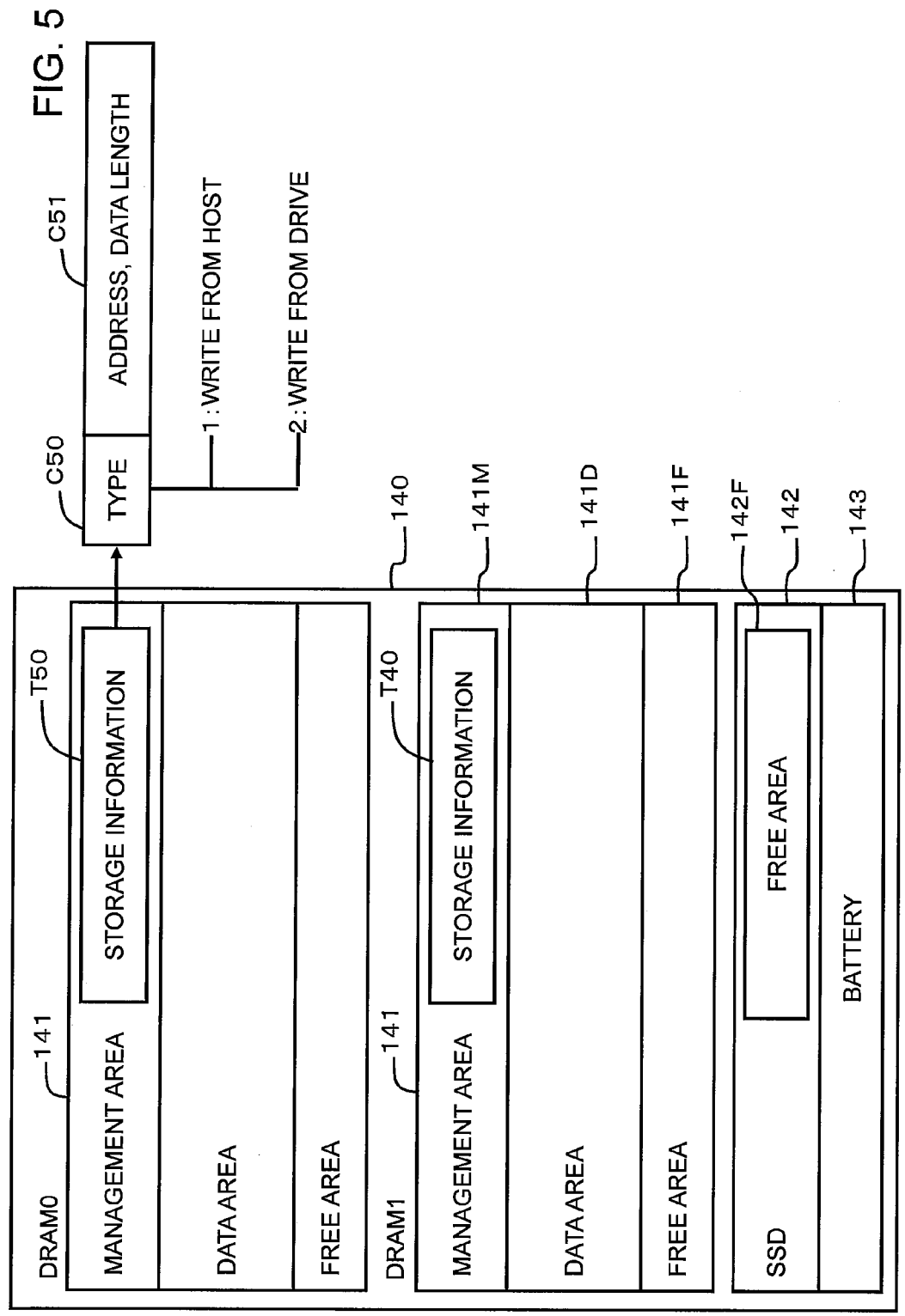
FIG. 5 shows the configuration of storage information that is stored in the memory package as a portion of directory information.

FIG. 5 schematically shows the storage configuration of the memory package 140. In the drawing, the cache memory is shown as DRAM. The storage area of the cache memory 141, for example, can be classified into three areas. The first area is a management area 141M. The second area is a data area 141D. The third area is a free area 141F.

The management information to be managed by the respective memory packages 140 is stored in the management area 141M. The management information comprises storage information T50. The storage information T50, for example, comprises a part C50 denoting a type, and a part C51 for storing an address and a data length.

A value denoting that either data received from the host is to be stored in the cache memory, or data received from the storage device (displayed as drive in the drawing) 210 is to be stored in the cache memory is set in the type part C50. A data storage-destination address and a data size are set in the part C51 that denotes the address and the data length.

In this way, the storage information T50 shows what kind of data is being stored where in the cache memory 141. Directory information, which is an aggregate of the respective storage information T50 being managed by the respective memory packages 140, is stored in the local memory 132 of the microprocessor package 130.

Data received from either the host or the storage device 210 is stored in the data area 141D. The storage destination of this received data is managed using the above-mentioned storage information T50 and directory information.

The free area 141F is an area into which data is not written. For example, when the host is carrying out frequent data reads, the size of the free area 141F becomes smaller, and the size of the data area 141D becomes larger.

A free area 142F also exists in the nonvolatile memory 143. The free area 142F of the nonvolatile memory 142 is used either together with the free area 141F or in place of the free 141F of the cache memory 141 as a storage area for configuring an alternate pair.

As described hereinabove, the cache memory size of the respective memory packages 140 can be different for each pair. In addition, the size of the data stored in the respective memory packages 140 will differ in accordance with how this data is being used. Therefore, the sizes of the data area 141D and the free area 141F will differ for each pair. The sizes of the data areas 141D and the free areas 141F of the memory packages 140 that configure the same pair will basically be the same except when maintenance work is being done.

FIG. 6 shows configuration information T10 for managing the configuration of the storage control apparatus 1. The configuration information T10 is stored in the local memory 132 of the microprocessor package 130.

The configuration information T10, for example, may comprise a slot number column C10, a serial number column C11, an accessory column C12, and a status column C13. The configuration information T10 may also comprise columns other than these.

A number for identifying each slot of the storage control apparatus 1 is set in the slot number column C10. An expansion priority sequence is preset in the slot number. For example, the lower the number, the higher the priority, and a board (package) that is mounted as standard in the storage control apparatus 1 is mounted in the slot comprising a high priority sequence slot number. Aboard (for example, a memory package) that is added as an option is mounted in the slot comprising a low priority slot number. That is, in a case where a memory package 140 is added to the storage control apparatus 1, the expansion sequence is predetermined.

Information for identifying the respective boards 110, 120, 130, 140, and 150 is stored in the serial number column C11.

The configuration of the respective board accessories is stored in the accessory column C12. The example of FIG. 6 shows the configuration of a cache memory module 141 (also called the cache memory 141) as the accessory of the memory package 140. For example, the cache memory module 141 is configured either in accordance with mounting four 4 GB DRAM or in accordance with mounting two 2 GB DRAM. As described hereinabove, the cache memory sizes of the memory packages 140 configuring the respective pairs are equivalent, but the cache memory size of each pair may be different.

The status of each board is stored in the status column C13. As the status, for example, either "GOOD" or "FAILURE" is set. In a normal case, "GOOD" is set, and when an abnormality occurs, "FAILURE" is set. In addition, for example, a value such as "CLOSE" is set for a blocked board.

Figure 7:
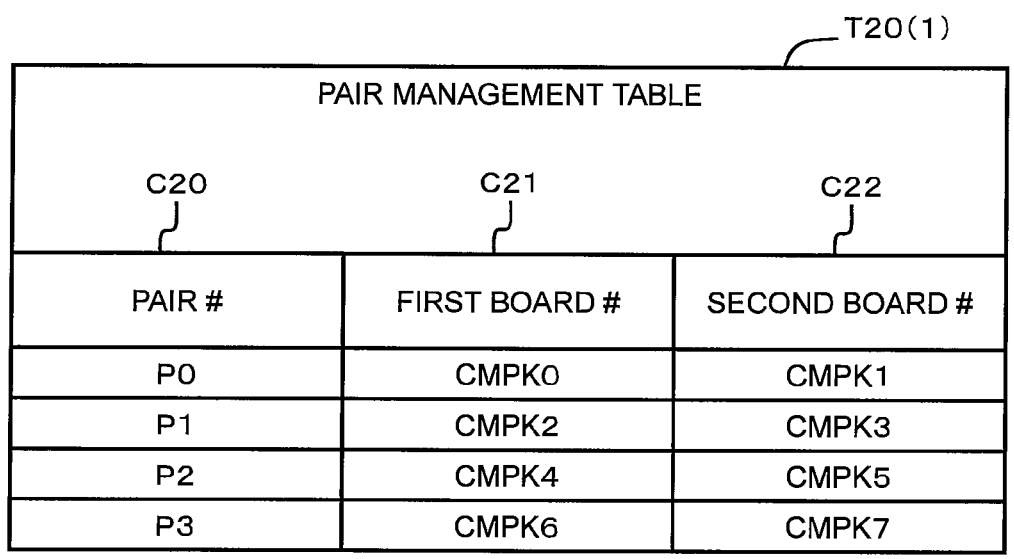
FIG. 7 shows the configuration of a pair management table that is stored in the microprocessor package as a single piece of management information.

FIG. 7 shows a table T20 for managing a pair of memory packages 140. The pair management table T20 is stored in the local memory 132 of the microprocessor package 130. Since FIG. 7 shows a pair prior to the start of maintenance work, (1) is appended to the reference sign T20.

The pair management table T20, for example, comprises a pair number column C20, a first board number column C21, and a second board number column C22. Information for identifying each pair is stored in the pair number column C20. Information (a serial number) for identifying the memory package 140 that comprises one pair is stored in the first board number column C21. Information (a serial number) for identifying the memory package 140 of the other pair is stored in the second board number column C22.

FIG. 8 shows the pair management table T20 when maintenance work is being performed. In the FIG. 8, (2) is added after the reference sign T20 to make a distinction with the pre-maintenance work pair management table T20(1). Information (a maintenance number) denoting that maintenance work is in progress is set in the column (either C21 or C22) of the board number of the memory package 140 that is undergoing maintenance work. In accordance with this information, the pair management table T20(2) is associated with a maintenance pair management table T30. In FIG. 8, the maintenance number "M1" is set as the number of the second board configuring the third pair P3.

The maintenance pair management table T30 is for managing a temporary pair (also called an alternate pair) that is configured temporarily at maintenance time. The maintenance management table T30 is stored in the local memory 132 of the microprocessor package 130.

The maintenance pair management table T30, for example, comprises a maintenance number column C30, a first board number column C31, and a second board number column C32. The maintenance number is set in the maintenance number column C30. Information for identifying the one storage area forming a pair is set in the first board number column C31. Information for identifying the other storage area forming the pair is set in the second board number column C32.

In the example shown in FIG. 8, either the cache memory 141 free area 141F addresses or any of the nonvolatile memory 142 free area 142F addresses of the other memory packages 140 (CMPK1, 3, 5) that belong to a power source boundary PSA different from that to which the maintenance-target (replacement-target) memory package 140 (CMPK7) belongs are associated with each address of the cache memory 141 of the maintenance-target memory package 140

(CMPK7). The configuration method of the temporary pair shown in FIG. 8 is an example, and as will be explained further below, a temporary pair can be defined using various methods.

FIG. 9 shows a free area management table T40 for managing the free areas 141F and 142F of a memory package 140. The free area management table T40 is stored in the local memory 132 of the microprocessor package 130.

The free area management table T40 comprises a board number column C40, a start address column C41, and an end address column C42. Information (for example, a serial number) for identifying each memory package 140, for example, is stored in the board number column C40. The start address of a free area is stored in the start address column C41. The end address of the free area is stored in the end address column C42.

The microprocessor 141 is able to discern the free areas 141F and 142F of the memory package 140 by using the free area management table T40.

The operation of the storage control apparatus 1 will be explained by referring to FIGS. 10, 11, and 12. The following processes are executed mainly by the microprocessor 131. The microprocessor 131 executes the respective processes by reading in and executing a prescribed computer program.

Figure 10:
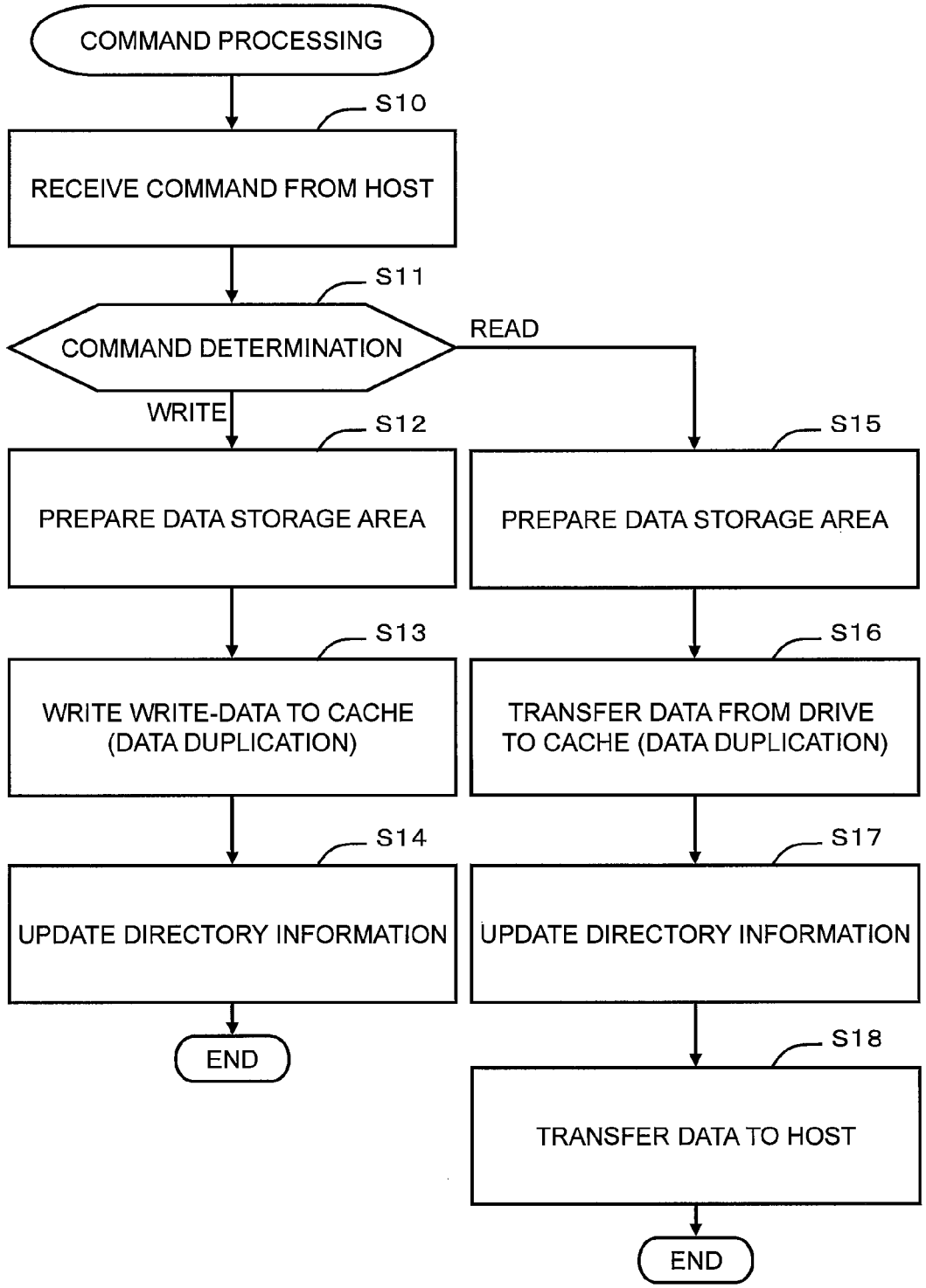
FIG. 10 is a flowchart of command processing, which is executed by the micropackage.

FIG. 10 is a flowchart for processing a command. A command (for example, a write command or a read command) issued from a host is received by the communication port of the channel adapter 110.

The channel adapter 110 transfers the command received from the host to any one microprocessor 131 from among the multiple microprocessors 131. For example, the channel adapter 110 identifies the processing-target logical volume based on an address included in the command, and selects one microprocessor 131 that has been associated with this logical volume beforehand. The channel adapter 110 transfers the received command to the selected microprocessor.

The command that is to be sent from the channel adapter 110 is stored in the local memory 132 of the microprocessor package 130. The microprocessor 131, upon detecting a queue update, receives this command and commences processing (S10).

The microprocessor 131 determines the command type (S11). In the case of a write command, the microprocessor 131 prepares a storage area for storing the write data (S12). The microprocessor 131 determines the two cache memories 141 for storing the write data, and identifies the addresses to which to write the write data.

The microprocessor 131 writes the write data received from the host to both the one cache memory 141 configuring the pair and to the other cache memory 141 configuring the pair (S13). In accordance with this, the write data received from the host is duplicatively managed.

The microprocessor 131 stores the write-destination address and the data length of the write data in the directory information (S14). In addition, the write-data type, the write-destination address and the data length are also stored in the storage information T50 of the cache memory 141 where the write data was stored.

In a case where the command received from the host is a read command, the microprocessor 131 prepares a storage area in the cache memory 141 for storing the data (read data) targeted by the read command (S15). The same as in the case of the write command, the microprocessor 131 determines the two cache memories 141 that configure a pair, and identifies the write-destination addresses of the read data.

The microprocessor 131 reads the data from the storage device 210 via the disk adapter 120, and transfers this data (the read data) to the two cache memories 141 prepared in S15 (S16). In accordance with this, the read data is duplicatively managed. The microprocessor 131 updates the respective storage information T50 and directory information (S17). Lastly, the microprocessor 131 transfers the read data from the cache memory 141 to the channel adapter 110, and sends the read data from the channel adapter 110 to the host (S18).

Figure 11:
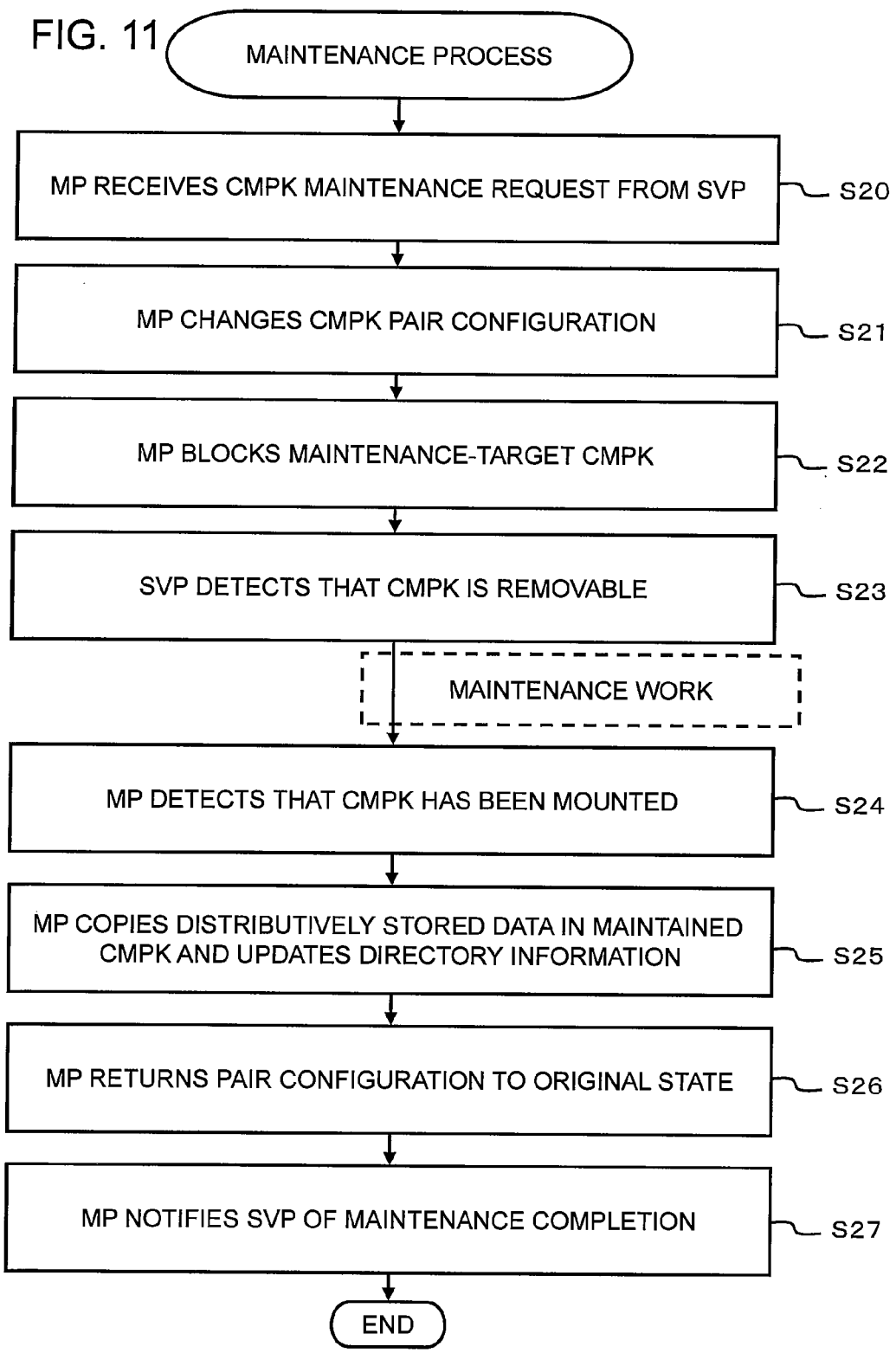
FIG. 11 is a flowchart of a maintenance process, which is executed by the microprocessor package.

FIG. 11 is a flowchart showing the processing at maintenance time. The processing is executed in a case where any memory package 140 is removed from the controller chassis 10 and subjected to maintenance work.

The user requests by way of the management terminal 30 that the controller 100 of the storage control apparatus 1 start maintenance work. A maintenance request comprises information (for example, either a slot number or a serial number) for identifying the maintenance-target memory package 140. The microprocessor 131 receives the memory package 140 maintenance request via the SVP 160 (S20).

The microprocessor 131 changes the configuration of the pair that duplicatively manages the data on the cache memories (S21). While the maintenance-target memory package 140 is removed from the storage control apparatus 1, the microprocessor 131 selects at least one or more memory packages to store the data in place of the maintenance-target memory package 140. The method for selecting the memory package(s) 140 for configuring the temporary pair will be explained using FIG. 12.

The microprocessor 131 executes a block process with respect to the maintenance-target memory package 140 (S22). When the block process is complete, the SVP 160 detects the fact that the maintenance-target memory package 140 is able to be removed (S23).

The user removes the desired memory package 140 from the controller chassis 10, and performs the desired maintenance work. The maintenance work, for example, may include the addition or removal of cache memory 141 and the replacement of a malfunctioning cache memory 141. The battery 143 supplies power to the respective cache memories 141 in the memory package 140 during the maintenance work. Therefore, the data stored in the respective cache memories 141 not targeted for replacement is maintained.

The host is also able to issue a command to the storage control apparatus 1 while the maintenance work is in progress. A command issued while the maintenance work is in progress is processed in accordance with the flowchart shown in FIG. 10. However, in S21 of FIG. 11, the pair for data duplication is changed from the normal pair to a temporary pair for maintenance work. Therefore, the data write destination will differ before and after maintenance work.

When the maintenance work is complete, the user mounts the memory package 140 to the controller chassis 10. When the memory package 140 is mounted to the mounting board, the microprocessor 131 detects this (S24).

The microprocessor 131 restores the data by copying the data that was distributed and stored in the multiple storage areas configuring the temporary pair during the maintenance work to the memory package 140 that was the target of the maintenance (S25). In addition, the microprocessor 131 updates the directory information and the respective storage information T50 in accordance with the data restore (S25).

When the data restore is complete, the microprocessor 131 restores the pair configuration from the temporary pair configuration to the normal pair configuration (S26). The microprocessor 131 notifies the SVP 160 to the effect that the series of processes (the data restore process and the pair configuration change process) accompanying the maintenance work on the memory package 140 has been completed (S27). The user learns that the maintenance work was completed normally from the status information sent to the management terminal 30 from the SVP 160.

Figure 12:
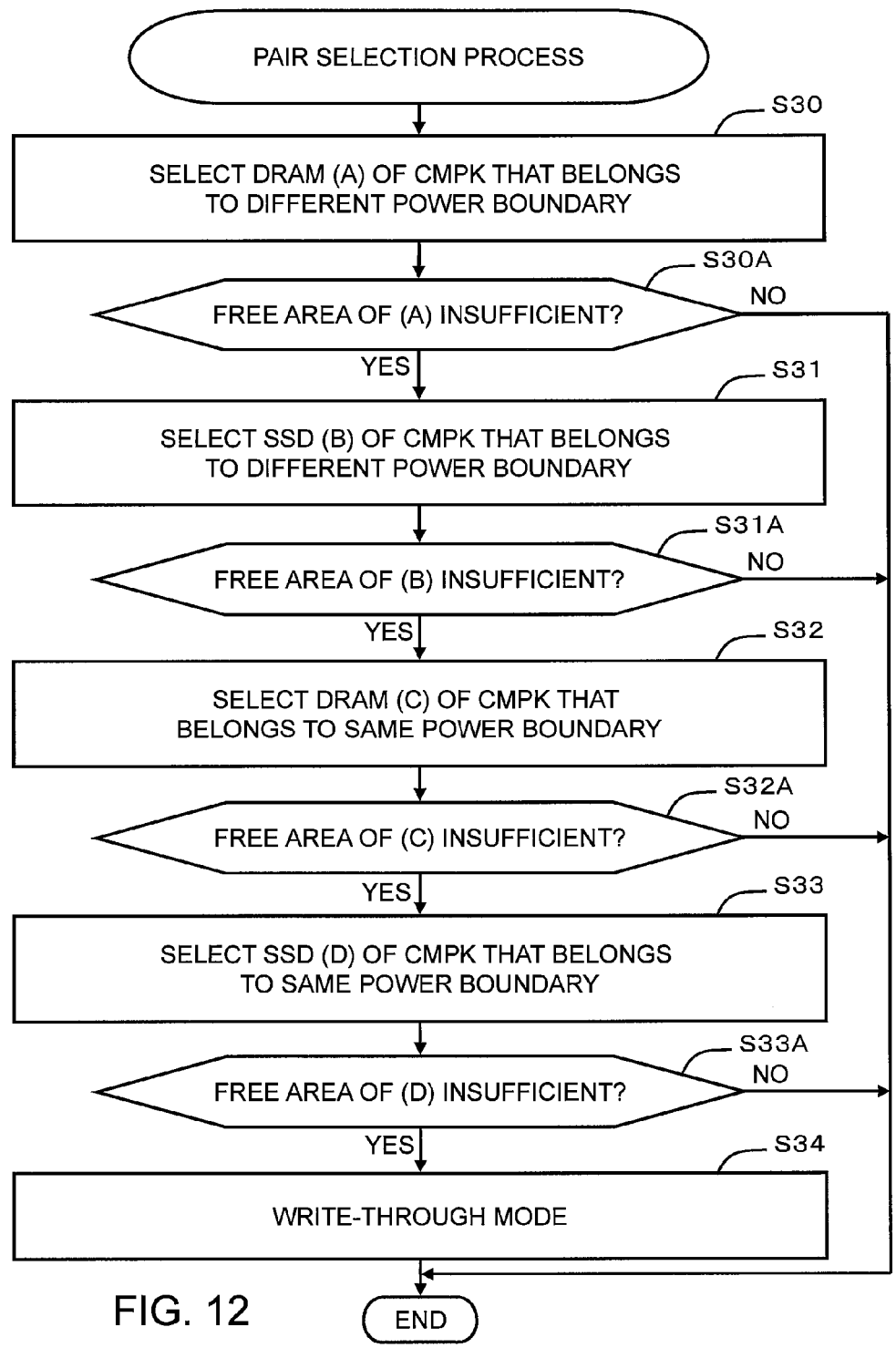
FIG. 12 is a flowchart of a pair-selection process, which is executed by the microprocessor package.

FIG. 12 is a flowchart showing the process for selecting the storage area(s) to configure the temporary pair. In this process, the temporary pair is configured using the five methods described hereinbelow. The memory package 140 that configures a pair with the maintenance-target memory package 140 here, for example, will be called the prescribed memory package 140.

First, the microprocessor 131 selects as the storage area of the alternate pair (temporary pair) the cache memories 141 of memory packages 140 belonging to a power source boundary that differs from that of the prescribed memory package 140 (S30).

Specifically, the microprocessor 131 selects, as storage areas for configuring an alternate pair, all of the free areas 141F of the memory packages 140 that belong to a power source boundary different from that to which the prescribed memory package 140 belongs. In the drawing, a reference sign (A) is assigned to this free area 141F. In a case where area (A) alone is sufficient (S30A: NO), the processing ends.

However, there could be cases where the free areas 141F of the cache memories 141 alone will not be sufficient (S30A: YES). In a case where the free areas 141F do not comprise a size that is equal to or larger than a prescribed value, the microprocessor 131 selects, as the storage area for configuring the alternate pair (S31), the free areas 142F of the nonvolatile memories 142 of the memory packages 140 that belong to a power source boundary different from that to which the prescribed memory package 140 belongs. In the drawing, a reference sign (B) is assigned to this free area 142F. In a case where area (B) is sufficient (S31A: NO), the processing ends.

The free area 142F of the nonvolatile memory 142 is used as the storage area for configuring the alternate pair either in addition to or instead of the free area 141F of the cache memory 141.

There could be a case in which the size of both the cache memory 141 free area 141F and the nonvolatile memory 142 free area 142F are insufficient (S31A: NO). In this case, the microprocessor 131 selects the free areas 141F of the cache memories 141 of other memory packages 130 that belong to the same power source boundary as that of the prescribed memory package 140 as the storage area for configuring the alternate pair (S32). In the drawing, a reference sign (C) is assigned to this free area 141F. In a case where area (C) is sufficient (S32A: NO), the processing ends.

In addition, the microprocessor 131 is also able to select the free areas 142F of nonvolatile memories 142 of other memory packages 140 that belong to the same power source boundary as that of the prescribed memory package 140 as the storage area for configuring the alternate pair (S33). In the drawing, a reference sign (D) is assigned to this free area 142F. In a case where area (D) is sufficient (S33A: NO), the processing ends.

In a case where a storage area equal to or larger than the prescribed size for configuring the alternate pair does not exist, the microprocessor 131 switches to the write-through mode (S34). In this case, the write data written to the cache memory 141 of the prescribed memory package 140 in S13 of FIG. 10 is also directly written to the corresponding storage device 210.

Figure 13:
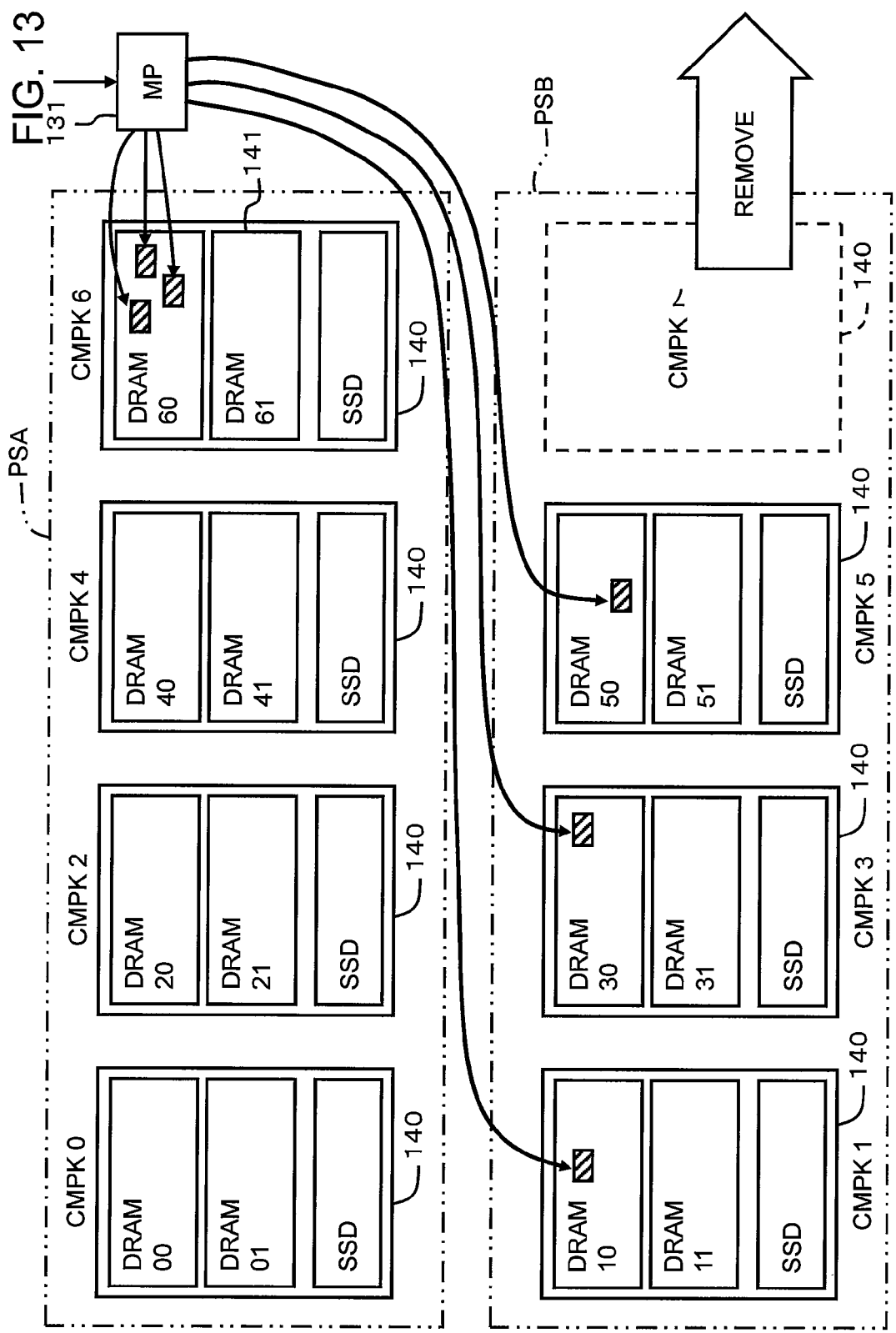
FIG. 13 is an illustration showing how data is distributively stored in multiple memory packages that configure a new pair.

FIG. 13 shows how data is distributively stored in multiple storage areas configuring an alternate pair during maintenance work.

In FIG. 13, the maintenance-target memory package 140 is the CMPK7. The prescribed memory package, which normally configures a pair with the maintenance-target memory package 140 (CMPK7), is CMPK6. An alternate pair, which is created temporarily at maintenance work time, is configured from the free areas 141F of the cache memories 141 of the memory packages 140 that belong to a power source boundary PSB different from the power source boundary PSA to which the prescribed memory package 140 (CMPK6) belongs.

That is, a virtual memory package for temporarily configuring an alternate pair with the cache memory 141 of the prescribed memory package 140 is configured from the free memories 141F of each of CMPK1, CMPK3 and CMPK5, which belong to a power source boundary PSB different from that to which the prescribed memory package 140 belongs.

The microprocessor 131 processes a command issued from the host while maintenance work is in progress, and writes the same data to the cache memory 141 of the prescribed memory package 140 and any one of the free areas 141F of the memory packages 140 configuring the alternate pair.

In the example shown in FIG. 13, the memory packages 140 comprise two cache memories 141 (DRAM in the drawing) each. Data that has been written to the one cache memory "DRAM 60" of the prescribed memory package 140 (CMPK6), for example, is written to any one of the free area of the one cache memory "DRAM 10" of the memory package 140 (CMPK1), the free area of the one cache memory "DRAM 30" of the memory package 140 (CMPK3), or the free area of the one cache memory "DRAM 50" of the memory package 140. As will be shown in the examples described further below, the writing of data to any storage area of the multiple storage areas configuring the alternate pair can be controlled using various methods.

Figure 14:
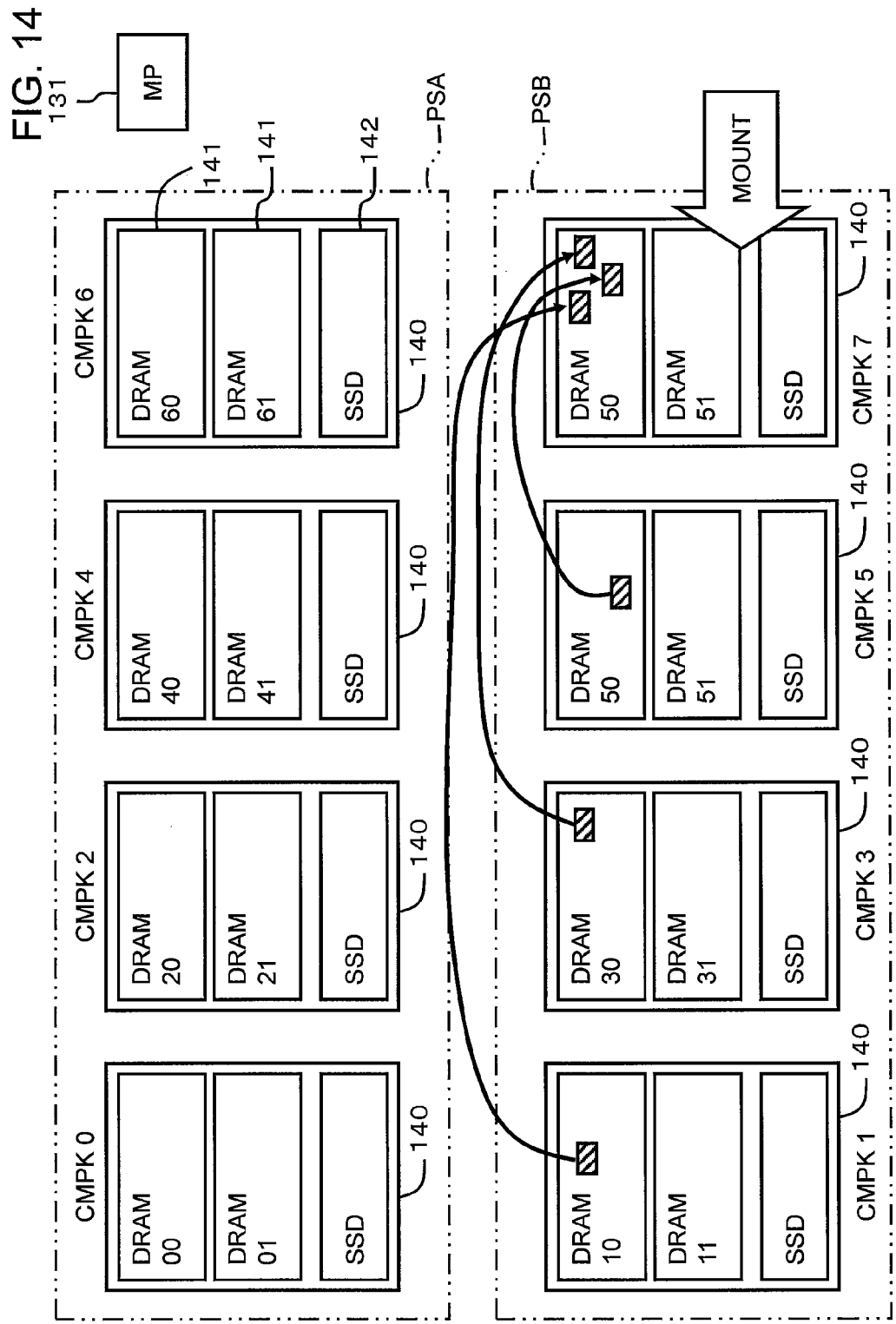
FIG. 14 is an illustration showing how the distributed data is written back to the memory package that was replaced.

FIG. 14 shows a data restore process in a case where maintenance work has been completed and the maintenance-target memory package 140 (CMPK7) has been mounted in the controller chassis 10 once again.

The microprocessor 131 issues an instruction to the memory packages 140 configuring the alternate pair, and transfers and stores the data (the data generated during the maintenance work) distributively written to the free areas 141F in the cache memory 141 of the memory package 140 (CMPK7) for which the maintenance work was completed.

The data of prior to the start of the maintenance work is maintained by a supply of power from the battery 143. Therefore, synchronization with the data stored in the prescribed memory package 140 (CMPK6) can be achieved by simply storing the data generated during the maintenance work in the memory package 140 for which the maintenance work was completed. In accordance therewith, the storage content of the prescribed memory package 140 (CMPK6) will match the storage content of the memory package 140 (CMPK7) for which the maintenance work was completed, making it possible to duplicatively manage the data.

In this example, since maintenance work can be carried out on a memory package 140 without suspending the storage control apparatus 1 as described hereinabove, user usability is enhanced.

In addition, in this example, data duplication can be achieved, and, in accordance with this, the reliability of the storage control apparatus 1 can be maintained even during maintenance work when the number of mounted memory packages 140 is less than at normal times.

In addition, in this example, since data duplication can be realized during maintenance work, it is possible to reduce the occasions when host write commands are processed using the write-after mode. Therefore, it is possible to curb a drop in the response performance of the storage control apparatus 1 during maintenance work.

In addition, in this example, since the data stored in the cache memory 141 of the maintenance-target memory package 140 is backed up by the battery 143, it is possible to reduce the size of the difference data required for the data restore. Therefore, the time required for the data restore can be shortened.

In addition, in this example, an alternate pair is configured using the free storage areas 141F and 142F of multiple memory packages 140. Therefore, the data stored in the free storage areas can be transferred in a parallel processing fashion to the memory package 140 for which the maintenance work was completed. Since the data can be transferred using multiple communication circuits, the time required for the data restore can be shortened. Therefore, in this example, the combination of the battery 143 backup for the data that existed prior to the start of the maintenance work and the configuration that copies the difference data from the multiple free areas using multiple communications circuits shortens the data restore time.

In addition, in this example, the multiple free areas for configuring the alternate pair are selected from among memory packages 140 belonging to a power source boundary different from the power source boundary to which the prescribed memory package 140 belongs. Therefore, data losses can be prevented even in a case where a power outage occurs while maintenance work is in progress. This enhances the reliability of the storage control apparatus 1.

EXAMPLE 2

Figure 15:
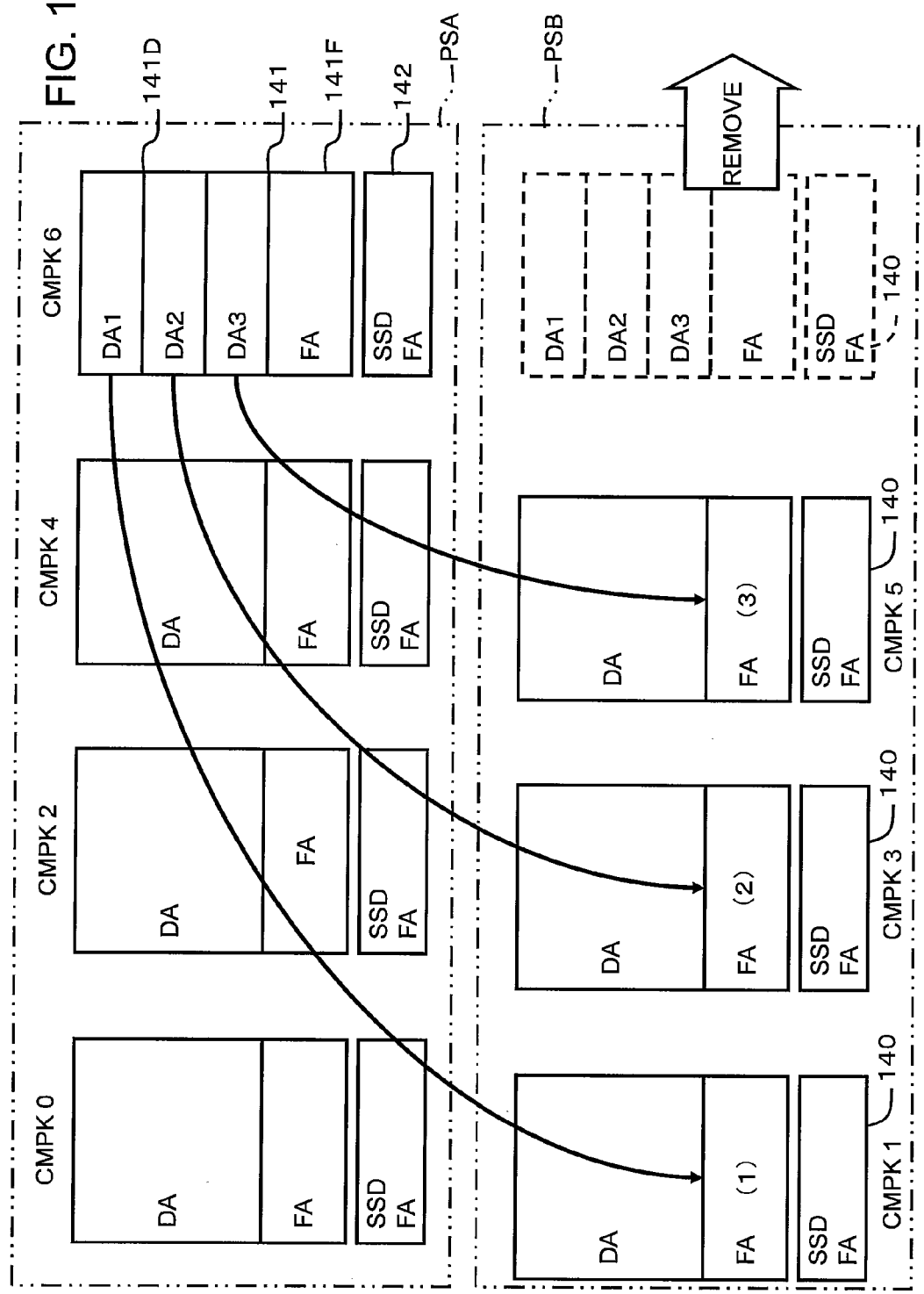
FIG. 15 is an illustration showing how data is distributed to multiple memory packages in a storage control apparatus related to a second example.

A second example will be explained by referring to FIG. 15. The examples below, to include this example, correspond to variations of the first example. Therefore, the explanations will focus of the differences with the first example. In the second example, the data area 141D of the cache memory 141 of the prescribed memory package 140 is partitioned into multiple sub-areas, and the sub-areas are associated with the free areas 141F (and/or 142F) for configuring the alternate pair.

In the cache memory 141 of the prescribed memory package 140 (CMPK6), the data area 141D is equally partitioned in accordance with the number of free areas (three in this example) configuring the alternate pair. That is, the data area 141D of the distribution-source cache memory 141 is partitioned into the three sub-areas of DA1, DA2 and DA3.

The first sub-area DA1 is associated with the first free area (the free area 141F of CMPK1) of the free area configuring the alternate pair. The second sub-area DA2 is associated with the second free area (the free area 141F of CMPK3). The third sub-area DA3 is associated with the third free area (the free area 141F of CMPK5).

Here, as was explained using the configuration information T10 shown in FIG. 6, an expansion priority sequence is set beforehand for the slots. This priority sequence denotes that CMPK0 and CMPK1 are the memory packages mounted as standard, and that CMPK2 through CMPK7 are memory packages added as options. The sequence of the free areas, i.e. the first free area, the second free area, and the third free area, can conform to the priority sequence at expansion time.

In this example, which is configured like this, the free area to be transferred for duplicating this data is determined in accordance with the location in which the data is written in the cache memory 141 of the prescribed memory package 140. In accordance with this, the same operational advantage as that of the first example is achieved.

EXAMPLE 3

Figure 16:
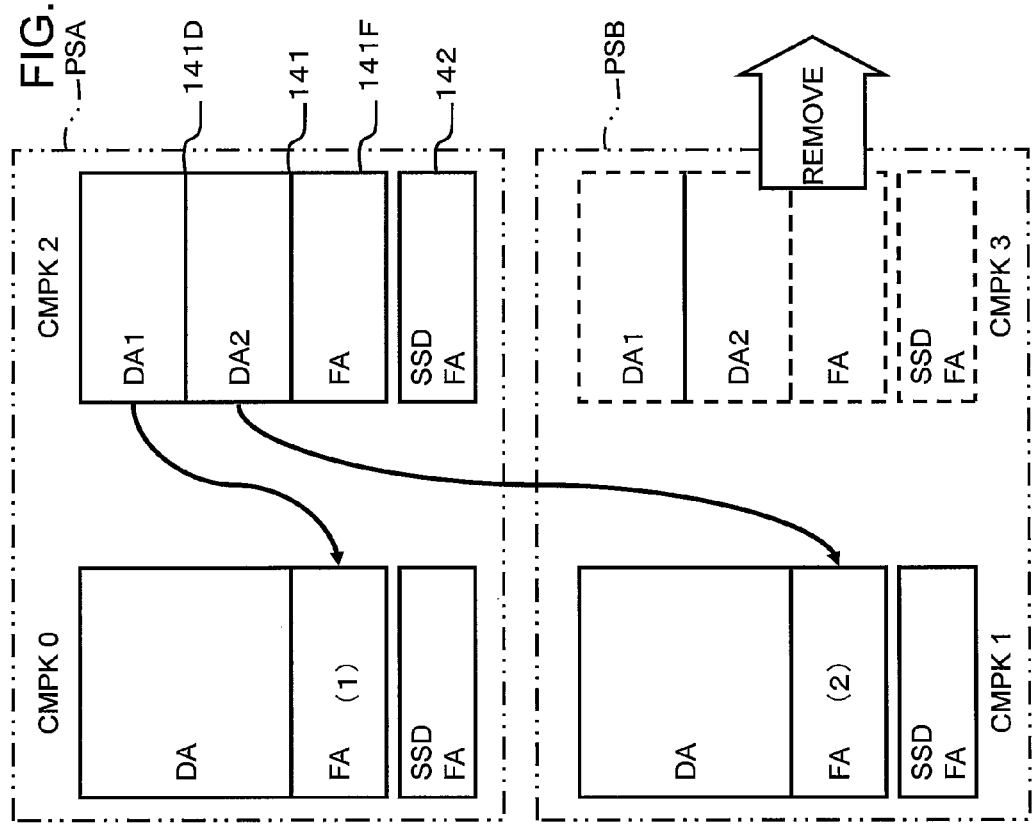
FIG. 16 is an illustration showing how data is distributed to multiple memory packages in a storage control apparatus related to a third example.

A third example will be explained by referring to FIG. 16. In this example, the method for selecting an alternate pair in a case where a small number of memory packages 140 are mounted in the storage control apparatus 1 will be explained.

In this example, a set of basic memory packages 140 (CMPK0 and CMPK1) and another set of expansion memory packages 140 (CMPK2 and CMPK3) are mounted in the controller chassis 10. Therefore, two memory packages 140 are capable of being selected as the alternate pair at maintenance time (total number of memory packages−number of prescribed memory packages−number of maintenance-target memory packages=4−1−1=2).

Therefore, the data area 141D of the cache memory 141 of the prescribed memory package 140 (CMPK2) is partitioned into two sub-areas DA1 and DA2. For example, the first sub-area DA1 is associated with the free area 141F of the cache memory 141 of the memory package 140 (CMPK0) belonging to the same power source boundary PSA as the prescribed memory package 140. The second sub-area DA2 is associated with the free area 141F of the memory package 140 (CMPK1) belonging to a power source boundary PSB different from that to which the prescribed memory package 140 belongs. Furthermore, the configuration may also be the reverse of that described above, and the DA1 may be associated with the free area of the CMPK1, and the DA2 may be associated with the free area of the CMPK0.

Configuring this example like this also makes it possible to achieve the same operational advantage as the first example. In addition, in this example, data duplication can be realized during maintenance work even in a case where a small number of memory packages 140 are mounted. However, in this example, since another memory package 140 belonging to the same power source boundary as that of the prescribed memory package 140 is used, reliability with respect to a power failure may be less than that of the first example.

EXAMPLE 4

A fourth example will be explained by referring to FIG. 17. This example prevents a drop in reliability resulting from a power failure even in a case where a small number of memory packages 140 are mounted.

The alternate pair of this example is configured from the free area 141F of the cache memory 141 of a memory package 140 (CMPK1) and the free area 142F of a nonvolatile memory 142, which belong to a power source boundary PSB that differs from that of the prescribed memory package 140 (CMPK2).

For example, a first sub-area DA1 is associated with the free area 141F of the cache memory 141 of the memory package 140 (CMPK1). A second sub-area DA2 is associated with the free area 142F of the nonvolatile memory 142 of the memory package 140 (CMPK1). The corresponding relationship may also be reversed. The configuration may be such that the DA1 is associated with the free area 142F of the nonvolatile memory 142 and the DA2 is associated with the free area 141F of the cache memory 141.

Configuring this example like this also makes it possible to achieve the same operational advantage as the first example. In addition, in this example, the alternate pair is configured using storage areas residing in a power source boundary that differs from the power source boundary to which the prescribed memory package 140 belongs. Therefore, reliability can be increased with respect to a power failure more than in the case of the third example.

EXAMPLE 5

A fifth example will be explained by referring to FIGS. 18 through 20. In this example, packet data is stored in the order it was received in multiple storage areas that configure an alternate pair.

In this example, a sequence is set for the round robin method based on the expansion priority sequence described hereinabove. The cache memory 141 of a memory package 140 (CMPK1) mounted as standard in the storage control apparatus 1 is set to the highest sequence R1. The next highest sequence R2 is set for the cache memory 141 of the memory package 140 (CMPK3), which has the highest expansion priority sequence of the memory packages 140 (CMPK2, 3, 4, 5, 6, 7) mounted as options. The third highest sequence R3 is set for the cache memory 141 of the memory package 140 (CMPK5).

The packet data PD1 that arrives first is stored in the free area 141F of the cache memory 141 that has been set to the first sequence R1. The packet data PD2 that arrives next is stored in the free area 141F of the cache memory 141 that has been set to the second sequence R2. The packet data PD3 that arrives last is stored in the free area 141F of the cache memory 141 that has been set to the third sequence R3.

As shown in FIG. 20, in a case where a fourth packet data PD4 arrives, this packet data PD4 is stored in the free area 141F of the cache memory 141 comprising the first sequence R1. Similarly, thereafter a PD5 is stored in the free area 141F of the cache memory 141 that is set to R2, and a PD6 is stored in the free area 141F of the cache memory 141 that is set to R3.

In this way, the free areas 141F of three locations are selected in accordance with a prescribed sequence R1, R2, R3. The packet data PD is stored in the selected free areas 141F in the order of arrival (the order it was received).

FIG. 19 is a flowchart of the pair selection process according to this example. The microprocessor 131 acquires the sequence R1 through R3 of the round robin method from the local memory 132 (S40).

Next, the microprocessor 131 selects from among the free areas 141F configuring the alternate pair the one free area 141F comprising the sequence corresponding to the packet data order of arrival (S41).

For example, in a case where there are no longer any free areas 141F in the cache memories 141 configuring the alternate pair due to the arrival of a large amount of packet data, the microprocessor 131 selects a free area 142F of a nonvolatile memory 142 (S42). In the drawing, a reference sign (E) is assigned to this free area 142F. In a case where area (E) is sufficient (S43: NO), the processing ends.

That is, the microprocessor 131 continues to select free areas 141F without adhering temporarily to the round robin method sequence while free areas 141F of the cache memories 141 exist. When there are no more cache memory 141 free areas 141F, a free area 142F of a nonvolatile memory 142 is selected.

Furthermore, in a case where the free areas 142F of the nonvolatile memories 142 also become used up (S43: YES), the microprocessor 131 switches to the write-through mode (S44).

FIG. 20 schematically shows how the packet data is transferred to multiple storage areas in accordance with the arrival order. Packet data PD1 through PD7 are stored in the free area 141F of the CMPK1 cache memory 141, the free area 141F of the CMPK3 cache memory 141, and the free area 141F of the CMPK5 cache memory 141 in accordance with the sequence of the round robin method.

In a case where the free area 141F of the CMPK3 cache memory 141 is used up first, packet PD8 bypasses one sequence of the round robin method and is stored in the free area 141F of the CMPK5 cache memory 141. The next packet data PD9 is stored in the free area 141F of the CMPK1 cache memory 141 that comprises the first sequence.

Packet data PD10 is stored in the free area 141F of the CMPK5 cache memory 141. The same as above, this is because there is no free area 141F in the CMPK3 cache memory 141.

It is supposed that the free areas 141F of the respective cache memories 141 were all used up at the point in time when the packet data PD10 was stored in the free area 141F of the CMPK5 cache memory 141.

Therefore, packet data PD11 and subsequent packet data are stored in sequence in the free area 142F of a nonvolatile memory 142. The packet data PD11 is stored in the free area 142F of the first-sequence CMPK1 nonvolatile memory 142. Packet data PD12 is stored in the free area 142F of the second-sequence CMPK3 nonvolatile memory 142. In a case where a packet data PD13 arrives, this packet data PD13 is stored in the free area 142F of the third-sequence CMPK5 nonvolatile memory 142.

Configuring this example like this also achieves the same effects as that of the first example. In addition, in this example, the microprocessor 131 switches the multiple storage areas configuring the alternate pair and stores this pilot data in the order in which the packet data arrived.

Therefore, this example makes it possible to efficiently use the respective free areas even in a case where the size of each free area 141F, 142F configuring the alternate pair differ.

EXAMPLE 6

A sixth example will be explained by referring to FIGS. 21 and 22. In this example, the received packet data is stored in either the cache memory 141 free area 141F or the nonvolatile memory 142 free area 142F so as to maintain the sequence of the round robin method.

FIG. 21 is a flowchart showing the pair selection process according to this example. The microprocessor 131 acquires the sequence of the round robin method (S50). The microprocessor 131 selects one cache memory 141 free area 141F that corresponds to the packet data arrival order (S51).

In a case where the cache memory 141 free areas 141F conforming to the sequence of the round robin method become used up, the free area 142F of the nonvolatile memory 142 mounted in the same memory package 140 as this cache memory 141 is selected (S52). That is, the storage areas of the memory package 140 corresponding to the sequence are used regardless of whether the storage area is the cache memory 141 or the nonvolatile memory 142 so as to maintain the sequence of the round robin method as much as possible. In the drawing, a reference sign (F) is assigned to this free area 142F. In a case where area (F) is sufficient (S53: NO), the processing ends.

Furthermore, in a case where the usable storage areas are used up (S53: YES), the write-through mode is selected the same as described hereinabove (S54).

FIG. 22 shows how packet data is stored in the storage areas of the respective memory packages 140 configuring the alternate pair in order of arrival. For example, it is supposed that the free area 141F of the CMPK3 cache memory 141 is used up at the point in time at which packet data PD5 is stored.

In accordance with the round robin method, in a case where the sequence for storing packet data PD8 has come around to CMPK3 once again, this packet data PD8 is stored in the free area 142F of the CMPK3 nonvolatile memory 142. The packet data PD11 of the next cycle is also stored in the free area 142F of the CMPK3 nonvolatile memory 142.

Configuring this example like this also achieves the same operational advantage as the first example. In addition, this example uses the multiple storage areas configuring the alternate pair by switching these storage areas in accordance with the round robin method in the order in which the packet data arrives. In addition, in this example, the free areas are used regardless whether these areas are in the cache memory 141 or in the nonvolatile memory 142 so as to maintain the sequence of the round robin method.

For this reason, in this example, the communication paths respectively coupled to the multiple storage areas configuring the alternate pair can be used more effectively than in the fifth example. In the case of the fifth example, it is supposed that the round robin sequence is ignored, and that an attempt is made to use up all the free areas 141F of the cache memories 141 configuring the alternate pair.

Therefore, as shown in FIG. 20, the larger the initial size of the free areas 141F of the cache memories 141, the more packet data is stored. For this reason, the usage frequency of the communication path that couples a cache memory 141 storing a large amount of packet data to the copy-destination cache memory 141 (the cache memory of the memory package 140 for which maintenance work was completed) increases at data restore, and the usage frequency of the other communication paths drops. Therefore, the data copy speed at data restore is likely to drop.

Alternatively, in this example, as shown in FIG. 22, the respective storage areas (141F, 142F) configuring the alternate pair are used in sequence so as to maintain the sequence of the round robin method as much as possible. Therefore, the data can be copied by using all of the multiple communication paths coupling the respective storage areas (141F, 142F), which constitute the copy source, to the cache memory 141, which constitutes the copy destination. This makes it possible to shorten the time required at data restore.

The present invention is not limited to the examples described hereinabove. A person having ordinary skill in the art will be able to make various additions and changes without departing from the scope of the present invention.

[Reference Signs List]
1 Storage control apparatus
2 Microprocessor
3 Memory package
3A Cache memory
3B Nonvolatile memory
3C Battery
4 Storage device
110 Channel adapter
120 Disk adapter
130 Microprocessor package
131 Microprocessor
140 Memory package
141 Cache memory
142 Nonvolatile memory
143 Battery

The invention claimed is:

1. A storage control apparatus for inputting and outputting data in response to a request from a higher-level apparatus, comprising:

multiple clusters supplied with power by different power devices,
wherein each of the clusters comprises:
a first communication control part for communicating with the higher-level apparatus;
a second communication control part for communicating with a storage device that stores data;
multiple memory parts, which are shared by the first communication control part and the second communication control part; and
a control part for controlling the first communication control part, the second communication control part, and the memory part,
each of the memory parts comprises:
a first memory having volatility;
a second memory having nonvolatility; and
a battery part that supplies power to the first memory and/or the second memory in a prescribed case,
a pair of the memory parts being configured from memory parts that belong to different clusters,
each of the control parts being configured:
when any one of the memory parts is to be replaced, to select, as an alternate memory part to be used in place of one of the memory parts that is a replacement-target memory part, at least a portion of a storage area of at least one memory part from among memory parts other than a prescribed memory part that configures a pair with the replacement-target memory part;
to configure a new pair using the prescribed memory part and the alternate memory part;
when data related to the prescribed memory part is received, to write the data to the prescribed memory part and to the alternate memory part, respectively;
to manage write locations of the data;
when the replacement-target memory part has been mounted, to write data that has been written to the alternate memory part, to the replacement-target memory part; and
to reconfigure the pair using the replacement-target memory part and the prescribed memory part, and
the battery part is configured to maintain data stored in the first memory by supplying power to the first memory where the replacement-target memory part has been removed as the prescribed case,
wherein each of the control parts, upon receiving an instruction for a request for a replacement from the management terminal, is configured to block the replacement-target memory part specified in the instruction,
each of the control parts is configured to select the alternate memory part based on any one method from among multiple methods,
in a first method included in the multiple methods, selecting, as the alternate memory part, an unused area of the first memory of each of all other memory parts which are included in a cluster to which the replacement-target memory part belongs from among the clusters,
in a second method included in the multiple methods, selecting, as the alternate memory part, an unused area of the second memory of all the other memory parts which are included in the cluster to which the replacement-target memory part belongs from among the clusters,
in a third method included in the multiple methods, selecting, as the alternate memory part, the unused area of the first memory of each of all memory parts other than the prescribed memory part which are included in another cluster that forms a pair with the cluster to which the replacement-target memory part belongs from among the clusters, in a fourth method included in the multiple methods, selecting, as the alternate memory part, the unused area of the second memory of each of all the memory parts other than the prescribed memory part which are included in the other cluster that forms a pair with the cluster to which the replacement-target memory part belongs from among the clusters, in a fifth method included in the multiple methods, operating using a write-through mode in which data is also written to the storage device where the data is written to the prescribed memory part without selecting the alternate memory part, wherein a priority sequence is set in descending order from the method, the second method, the third method, the fourth method, and the fifth method, switching can be performed from the method with the highest priority to the method with the lowest priority from among the methods, each of the control parts configures a new pair using the prescribed memory part and each of the alternate memory parts, each of the control parts is configured to use one of a mode in which the storage area of the prescribed memory part is partitioned and the storage areas are associated beforehand to the respective alternate memory parts, and received data targeted at the prescribed memory part is respectively transferred to the prescribed memory part and the corresponding alternate memory part of the respective alternate memory parts, and a mode in which a prescribed sequence is set for the respective alternate memory parts, and the received data is respectively transferred to the prescribed memory part and any one of the alternate memory parts in the prescribed sequence, each of the control parts is configured to manage write locations of the received data, each of the control parts, upon being inputted with an instruction from the management terminal denoting the completion of replacement, is configured to determine that the replacement-target memory part has been mounted and to write the received data, which has been written to the respective alternate memory parts, to the replacement-target memory part, and the control part is configured to reconfigure the pair using the replacement-target memory part and the prescribed memory part.

2. A storage control apparatus according to claim 1, wherein each of the control parts is configured to select, as the alternate memory part, an unused area of the first memory of each of all other memory parts which are included in a cluster to which the replacement-target memory part belongs from among the clusters.

3. A storage control apparatus according to claim 1, wherein each of the control parts is configured to select, as the alternate memory part, an unused area of the second memory of each of all the other memory parts which are included in a cluster to which the replacement-target memory part belongs from among the clusters.

4. A storage control apparatus according to claim 1, wherein each of the control parts is configured to select, as the alternate memory part, an unused area of the first memory of each of all memory parts other than the prescribed memory part which are included in another cluster that forms a pair with a cluster to which the replacement-target memory part belongs from among the clusters.

5. A storage control apparatus according to claim 1, wherein each of the control parts is configured to select, as the alternate memory part, an unused area of the second memory of each of all the memory parts other than the prescribed memory part which are included in the other cluster that forms a pair with the cluster to which the replacement-target memory part belongs from among the clusters.

6. A storage control apparatus according to claim 1, wherein each of the control parts is configured to partition the storage area of the prescribed memory part and associates the storage areas beforehand to the respective alternate memory parts, and respectively transfers and stores received data targeted at the prescribed memory part in the prescribed memory part and the corresponding alternate memory part of the respective alternate memory parts.

7. A storage control apparatus according to claim 1, wherein each of the control parts is configured to set a prescribed sequence for the respective alternate memory parts, and respectively to transfer and store received data in the prescribed memory part and any one of the alternate memory parts in the prescribed sequence.

8. A storage control apparatus according to claim 7, wherein each of the control parts is configured to select, as the alternate memory parts, an unused area of each of the first memories and an unused area of each of the second memories, respectively, the prescribed sequence is set in memory part units, each of the control parts is configured to write the received data in the prescribed sequence to the respective unused areas of the respective first memories until the unused areas of the first memories are used up, and where the unused areas of the first memories have been used up, each of the control parts writes the received data in the prescribed sequence to the unused area of each of the second memories.

9. A storage control apparatus according to claim 7, wherein each of the control parts is configured to select, as the alternate memory parts, an unused area of each of the first memories and an unused area of each of the second memories, respectively, the prescribed sequence is set in memory part units, each of the control parts is configured to write the received data to any of the unused area of the first memory or the unused area of the second memory in a memory part selected in accordance with the prescribed sequence so as to maintain the prescribed sequence.

10. A storage control apparatus according to claim 1, wherein the replacement-target memory part has been mounted such that each of the control parts writes data that has been written to the alternate memory part to the replacement-target memory part, and thereafter releases the data that has been written to the alternate memory part.

11. A method for controlling a memory of a storage control apparatus for inputting and outputting data in response to a request from a higher-level apparatus, the storage control apparatus comprising multiple clusters which are supplied with power by different power devices, each of the clusters comprising:

a first communication control part for communicating with the higher-level apparatus;

a second communication control part for communicating with a storage device that stores data;

multiple memory parts, which are shared by the first communication control part and the second communication control part; and a control part for controlling the first communication control part, the second communication control part, and the memory part, and each of the memory parts comprising:

a first memory having volatility;

a second memory having nonvolatility; and a battery part for maintaining data stored in the first memory by supplying power to the first memory where the memory part is removed from the storage control apparatus, wherein each of the control parts:

causes a pair of the memory parts to be configured from memory parts that belong to different clusters, when any one of the memory parts is to be replaced, selects, as an alternate memory part to be used in place of one of the memory parts that is a replacement-target memory part, at least a portion of a storage area of at least one memory part from among memory parts other than a prescribed memory part that configures a pair with the replacement-target memory part;

configures a new pair using the prescribed memory part and the alternate memory part;

when data related to the prescribed memory part is received, writes the data to the prescribed memory part and to the alternate memory part, respectively;

manages write locations of the data;

when the replacement-target memory part has been mounted, writes data that has been written to the alternate memory part, to the replacement-target memory part; and reconfigures the pair using the replacement-target memory part and the prescribed memory part, wherein each of the control parts, upon receiving an instruction for a request for a replacement from the management terminal, is configured to block the replacement-target memory part specified in the instruction, each of the control parts is configured to select the alternate memory part based on any one method from among multiple methods, in a first method included in the multiple methods, selecting, as the alternate memory part, an unused area of the first memory of each of all other memory parts which are included in a cluster to which the replacement-target memory part belongs from among the clusters, in a second method included in the multiple methods, selecting, as the alternate memory part, an unused area of the second memory of all the other memory parts which are included in the cluster to which the replacement-target memory part belongs from among the clusters, in a third method included in the multiple methods, selecting, as the alternate memory part, the unused area of the first memory of each of all memory parts other than the prescribed memory part which are included in another cluster that forms a pair with the cluster to which the replacement-target memory part belongs from among the clusters, in a fourth method included in the multiple methods, selecting, as the alternate memory part, the unused area of the second memory of each of all the memory parts other than the prescribed memory part which are included in the other cluster that forms a pair with the cluster to which the replacement-target memory part belongs from among the clusters, in a fifth method included in the multiple methods, operating using a write-through mode in which data is also written to the storage device where the data is written to the prescribed memory part without selecting the alternate memory part, wherein a priority sequence is set in descending order from the first method, the second method, the third method, the fourth method, and the fifth method, switching can be performed from the method with the highest priority to the method with the lowest priority from among the methods, each of the control parts configures a new pair using the prescribed memory part and each of the alternate memory parts, each of the control parts is configured to use one of a mode in which the storage area of the prescribed memory part is partitioned and the storage areas are associated beforehand to the respective alternate memory parts, and received data targeted at the prescribed memory part is respectively transferred to the prescribed memory part and the corresponding alternate memory part of the respective alternate memory parts, and a mode in which a prescribed sequence is set for the respective alternate memory parts, and the received data is respectively transferred to the prescribed memory part and any one of the alternate memory parts in the prescribed sequence, each of the control parts is configured to manage write locations of the received data, each of the control parts, upon being inputted with an instruction from the management terminal denoting the completion of replacement, is configured to determine that the replacement-target memory part has been mounted and to write the received data, which has been written to the respective alternate memory parts, to the replacement-target memory part, and the control part is configured to reconfigure the pair using the replacement-target memory part and the prescribed memory part.

\* \* \* \* \*